United States Patent
Allen, Jr. et al.

(10) Patent No.: US 10,417,839 B2
(45) Date of Patent: Sep. 17, 2019

(54) SYSTEM AND METHOD FOR VEHICLE ASSESSMENT AND USES THEREOF

(71) Applicant: NavResearch, Inc., Liberty, TX (US)

(72) Inventors: A. C. Allen, Jr., Liberty, TX (US); Dennis Jump, Denton, TX (US); Paul E. Barrett, Scituate, MA (US)

(73) Assignee: Navigation Research Company, Liberty, TX (US)

( * ) Notice: Subject to any disclaimer, the term of this patent is extended or adjusted under 35 U.S.C. 154(b) by 0 days.

(21) Appl. No.: 15/164,722

(22) Filed: May 25, 2016

(65) Prior Publication Data

US 2017/0345227 A1    Nov. 30, 2017

(51) Int. Cl.
G07C 5/00 (2006.01)
G06F 16/951 (2019.01)
G07C 5/08 (2006.01)

(52) U.S. Cl.
CPC .......... G07C 5/008 (2013.01); G06F 16/951 (2019.01); G07C 5/08 (2013.01)

(58) Field of Classification Search
None
See application file for complete search history.

(56) References Cited

U.S. PATENT DOCUMENTS

| | | | |
|---|---|---|---|
| 6,434,455 B1 * | 8/2002 | Snow | G06F 11/2294 701/31.4 |
| 6,941,203 B2 | 9/2005 | Chen | |
| 6,947,816 B2 | 9/2005 | Chen | |
| 7,103,460 B1 | 9/2006 | Breed | |

(Continued)

FOREIGN PATENT DOCUMENTS

| | | |
|---|---|---|
| DE | 102 13 165 | 1/2004 |
| EP | 0350295 A2 | 1/1990 |

(Continued)

OTHER PUBLICATIONS

International Search Report of PCT/US2017/034161 dated Sep. 7, 2017, 2 pp.

(Continued)

*Primary Examiner* — Redhwan K Mawari
*Assistant Examiner* — Edward Torchinsky
(74) *Attorney, Agent, or Firm* — Lathrop Gage LLP

(57) ABSTRACT

A vehicle assessment analyzer is in communication with a vehicle, via the vehicle network computer and the vehicle communication bus. The vehicle assessment analyzer obtains the vehicle VIN from the vehicle and transmits the VIN to a vehicle assessment analytics server. The vehicle assessment analytics server then determines assessment readings to be performed on the vehicle, such as individual electronic sensors therein, to generate an overall vehicle assessment as compared to other vehicles of similar make, model, etc. These assessment readings are sent to the vehicle assessment analyzer which obtains the associated data and transmits the data back to the server for generation of the overall vehicle assessment. The assessment readings may query the vehicle network computer via standard assessment readings, and heightened assessment readings, and may also query the vehicle communications bus directly thereby obtaining any desired electronic information available from the vehicle.

22 Claims, 12 Drawing Sheets

(56) References Cited

U.S. PATENT DOCUMENTS

| | | |
|---|---|---|
| RE40,799 E | 6/2009 | Chen |
| 7,751,955 B2 * | 7/2010 | Chinnadurai ...... G05B 23/0235 |
| | | 701/29.3 |
| 8,296,007 B2 * | 10/2012 | Swaminathan ...... G07C 5/0858 |
| | | 701/29.1 |
| 8,825,271 B2 | 9/2014 | Chen |
| 8,880,274 B2 | 11/2014 | Chenn |
| 8,886,391 B2 | 11/2014 | Bertosa et al. |
| 8,907,816 B2 | 12/2014 | Ramseyer |
| 8,930,064 B2 * | 1/2015 | Merg ...... G07C 5/008 |
| | | 701/29.1 |
| 8,930,067 B1 | 1/2015 | Green et al. |
| 8,954,222 B2 | 2/2015 | Costantino |
| 8,970,359 B2 | 3/2015 | Barth et al. |
| 8,996,230 B2 | 3/2015 | Lorenz et al. |
| 9,002,554 B2 | 4/2015 | Chen |
| 9,014,908 B2 | 4/2015 | Chen et al. |
| 9,043,073 B2 | 5/2015 | Ricci |
| 9,043,078 B2 | 5/2015 | Johnson et al. |
| 9,097,195 B2 | 8/2015 | Willard et al. |
| 9,100,804 B2 | 8/2015 | Draznin |
| 9,142,066 B2 | 9/2015 | Chen et al. |
| 9,176,680 B2 | 11/2015 | Chen et al. |
| 9,189,895 B2 | 11/2015 | Phelan et al. |
| 9,189,896 B2 | 11/2015 | Ghoneim et al. |
| 9,196,098 B2 | 11/2015 | Phelan et al. |
| 9,199,517 B2 | 12/2015 | Shima et al. |
| 10,152,836 B2 | 12/2018 | Rozint |
| 2005/0119809 A1 | 6/2005 | Chen |
| 2007/0005202 A1 | 1/2007 | Breed |
| 2007/0124039 A1 | 5/2007 | Sakurai et al. |
| 2008/0071882 A1 | 3/2008 | Hering et al. |
| 2009/0043887 A1 * | 2/2009 | Coekaerts ........... G06F 11/0709 |
| | | 709/224 |
| 2009/0248235 A1 | 10/2009 | Hering et al. |
| 2011/0054769 A1 | 3/2011 | Krengiel |
| 2012/0166040 A1 | 6/2012 | Hwang et al. |
| 2012/0245786 A1 | 9/2012 | Fedorchuk et al. |
| 2012/0271503 A1 | 10/2012 | Owens et al. |
| 2013/0151065 A1 | 6/2013 | Ricci |
| 2013/0261884 A1 | 10/2013 | Richards et al. |
| 2014/0058618 A1 | 2/2014 | Rude et al. |
| 2014/0074345 A1 | 3/2014 | Gabay et al. |
| 2014/0277908 A1 | 9/2014 | Fish et al. |
| 2015/0052226 A1 | 2/2015 | Rude |
| 2015/0073647 A1 | 3/2015 | Ubik et al. |
| 2015/0170430 A1 | 6/2015 | Von Querfurt et al. |
| 2015/0302668 A1 | 10/2015 | Yuasa et al. |
| 2015/0310677 A1 | 10/2015 | Shin et al. |
| 2015/0339923 A1 | 11/2015 | Konig et al. |
| 2015/0371457 A1 | 12/2015 | Bakfan et al. |
| 2016/0035150 A1 | 2/2016 | Barfield, Jr. et al. |
| 2018/0293813 A1 | 10/2018 | Rozint |

FOREIGN PATENT DOCUMENTS

| | | |
|---|---|---|
| JP | 2016004470 A | 1/2016 |
| WO | WO 1999/036297 A1 | 7/1999 |

OTHER PUBLICATIONS

International Preliminary Report on Patentability of PCT/US2017/034161 dated Nov. 27, 2018, 7 pp.

* cited by examiner

| PARAMETER DESCRIPTION | PARAMETER_ID | UNITS | TX_ID | RX_ID | SERVICE_ID | CONTROLLER_ID | IS_HEIGHTENED | FUNCTION |
|---|---|---|---|---|---|---|---|---|
| ODOMETER | 0x1123 | BIT | 0x7E0 | 0x7E8 | 0x22 | 6 | TRUE | 1 |
| REMAINING FUEL | 0x004E | % | 0x7E0 | 0x7E8 | 0x22 | 6 | TRUE | 2 |
| MAP SENSOR | 0x000D | PSI | 0x7E0 | 0x7E8 | 0x22 | 6 | TRUE | 3 |

FIG. 4A

| PARAMETER DESCRIPTION | MESSAGE_ID | UNITS | MULTIPLEX MASK | MULTIPLEX VALUE | ENDIAN | BIT POSITION | BIT COUNT | OFFSET | SCALE MULTIPLIER | SCALE DIVISOR | SCALE OFFSET | FUNCTION |
|---|---|---|---|---|---|---|---|---|---|---|---|---|
| ODOMETER | 0x0123 | Km | | | 0 | 0 | 16 | 0 | 1 | 24 | 0 | 4 |
| ODOMETER | 0x0456 | Miles | 0xAB000000 | 0x23000000 | 1 | 2 | 16 | 0 | 1 | 1 | 0 | 5 |
| SPEED | 0x00A1 | MPH | | | 0 | 4 | 32 | 0 | 1 | 50 | 0 | 6 |
| TIRE PRESSURE | 0x011F | PSI | | | 0 | 12 | 4 | 0 | 2 | 1 | 0 | 7 |
| TIRE PRESSURE | 0x011F | PSI | | | 0 | 16 | 4 | 0 | 2 | 1 | 0 | 8 |
| TIRE PRESSURE | 0x011F | PSI | | | 0 | 20 | 4 | 0 | 2 | 1 | 0 | 9 |

FIG. 4B

SYSTEM AND METHOD FOR VEHICLE ASSESSMENT AND USES THEREOF

BACKGROUND

Vehicle diagnostics are typically performed via a live, in person, review of the vehicle. For example, a live person performs a "25-Point" inspection of the vehicle including visual inspections, as well as certain electrical inspections. Often, when a vehicle has a faulty operating electrical component, such as a faulty oxygen ($O_2$) sensor, for example, the vehicle will set a "trouble code" and illuminate the maintenance indicator light (MIL) or "check-engine" light. The owner must then bring the vehicle into a dealer, or other mechanic, to perform a vehicle "check-engine-light" scan. To facilitate a scan, a diagnostic reader is connected to the vehicle via an on-board-diagnostic computer (OBD) connector. The on-board-diagnostic computer then transmits "trouble codes" to the diagnostic reader.

OBD scans are limited in the amount and types of data accessible from the vehicle. For example, data from basic sensors may be transmitted to the diagnostic reader, but the diagnostic reader is limited in access to a variety of sensors indirectly via the industry (e.g. Society of Automotive Engineers (SAE)) standards based OBD (including OBD I, II, III, etc.) system because each electronic control module (ECM) or sensor controller area network (CAN) bus code varies from vehicle to vehicle, and manufacturer to manufacturer and are not easily available. The standard vehicle OBDII system was designed with monitoring emission information in mind not deeper electrical system assessment at the actual sensor level. Other types of malfunctions within the electrical system are not detectable with simple scanners and may not cause the vehicle to illuminate the MIL or register a "trouble code."

During vehicle sales, such as at a vehicle auction or person-to-person direct sale, it is imperative to have knowledge of a vehicle's health to determine an appropriate price. Current vehicle health scores are based on the above discussed "point" inspections. These scores, however, must be performed by a trained inspector and are entirely subjective based on the given inspector. Moreover, the inspector has limited access to electrical data of the vehicle.

SUMMARY OF THE INVENTION

In one aspect, a vehicle assessment analyzer includes a vehicle interface adapted to couple with a vehicle network computer and a vehicle communication bus. The vehicle assessment analyzer may also include a communication interface adapted to communicate with a vehicle assessment analytics server. The vehicle assessment analyzer may also include a processor in communication with memory, the memory storing computer readable instructions that when executed by the processor send an initial data request to the vehicle network computer to obtain a vehicle identification number (VIN), transmit, via communication interface, an initial data packet, including the VIN, to the vehicle assessment analytics server, receive, via communications interface, an assessment list from the vehicle assessment analytics server, the assessment list identifying one or more assessment readings to be performed on the vehicle by the vehicle assessment analyzer, and transmit back, via the communications interface, an assessment data packet to the vehicle assessment analytics server, the assessment data packet including data obtained from the vehicle based on the assessment readings performed according to the transmitted assessment list.

In another aspect, a vehicle assessment analytics server includes a processor in communication with memory, the memory storing computer readable instructions that when executed by the processor: receive an initial data packet from a vehicle assessment analyzer including a vehicle identification number (VIN) of a vehicle, transmit, based on the VIN, an assessment list including one or more assessment readings to be performed by the vehicle assessment analyzer on the vehicle, receive assessment data from the vehicle assessment analyzer based on the one or more assessment readings, and generate a vehicle assessment based on the assessment data.

BRIEF DESCRIPTION OF THE FIGURES

The foregoing and other features and advantages of the disclosure will be apparent from the more particular description of the embodiments, as illustrated in the accompanying drawings, in which like reference characters refer to the same parts throughout the different figures. The drawings are not necessarily to scale, emphasis instead being placed upon illustrating the principles of the disclosure.

FIGS. 4A-4B depict exemplary information tables including information for generating vehicle assessment list, and analyzing the captured vehicle assessment readings from vehicle, in embodiments.

DETAILED DESCRIPTION OF THE EMBODIMENTS

Figure 1:
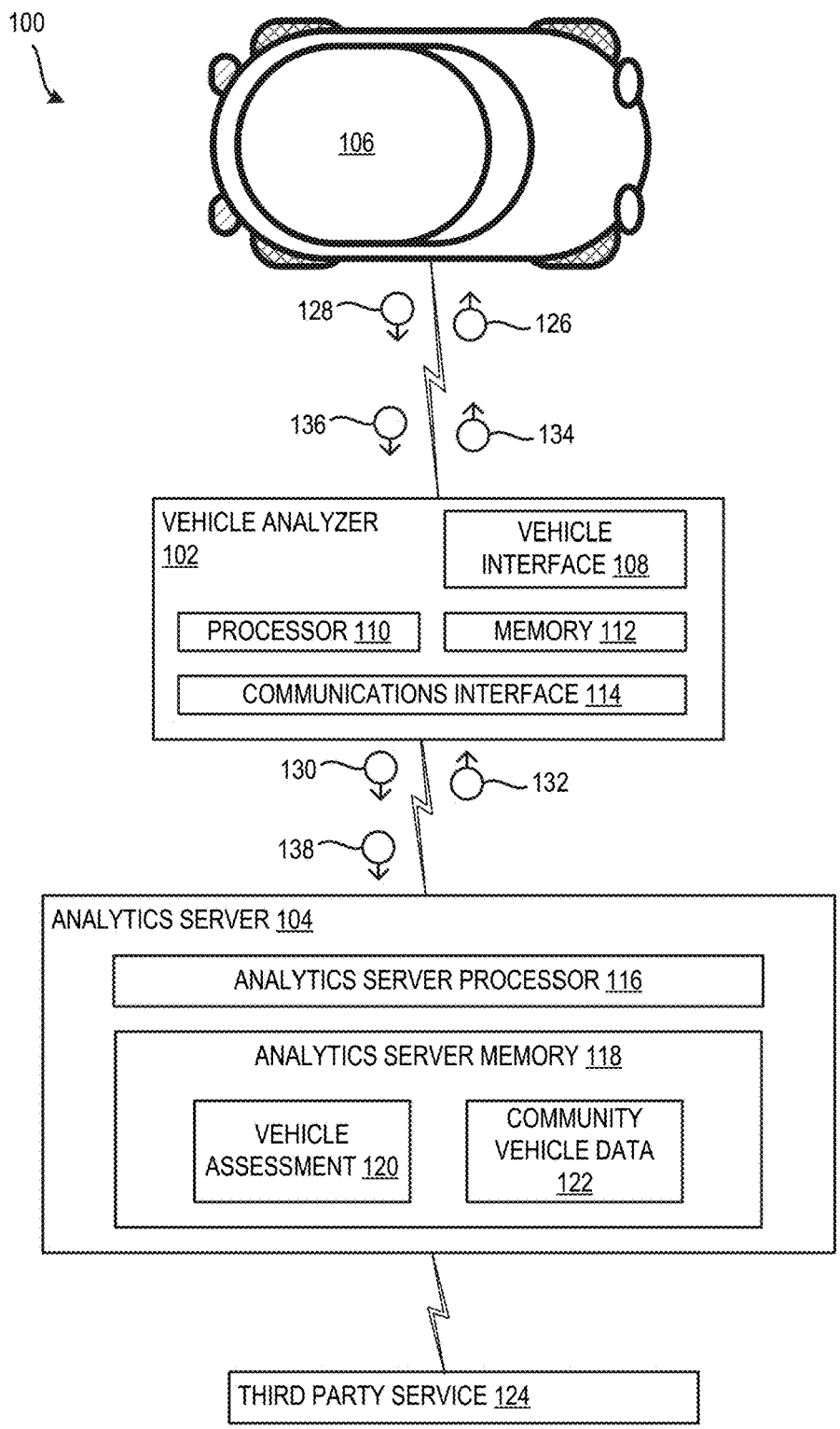
FIG. 1 depicts an exemplary system for vehicle analytic assessment, in embodiments.
Figure 2:
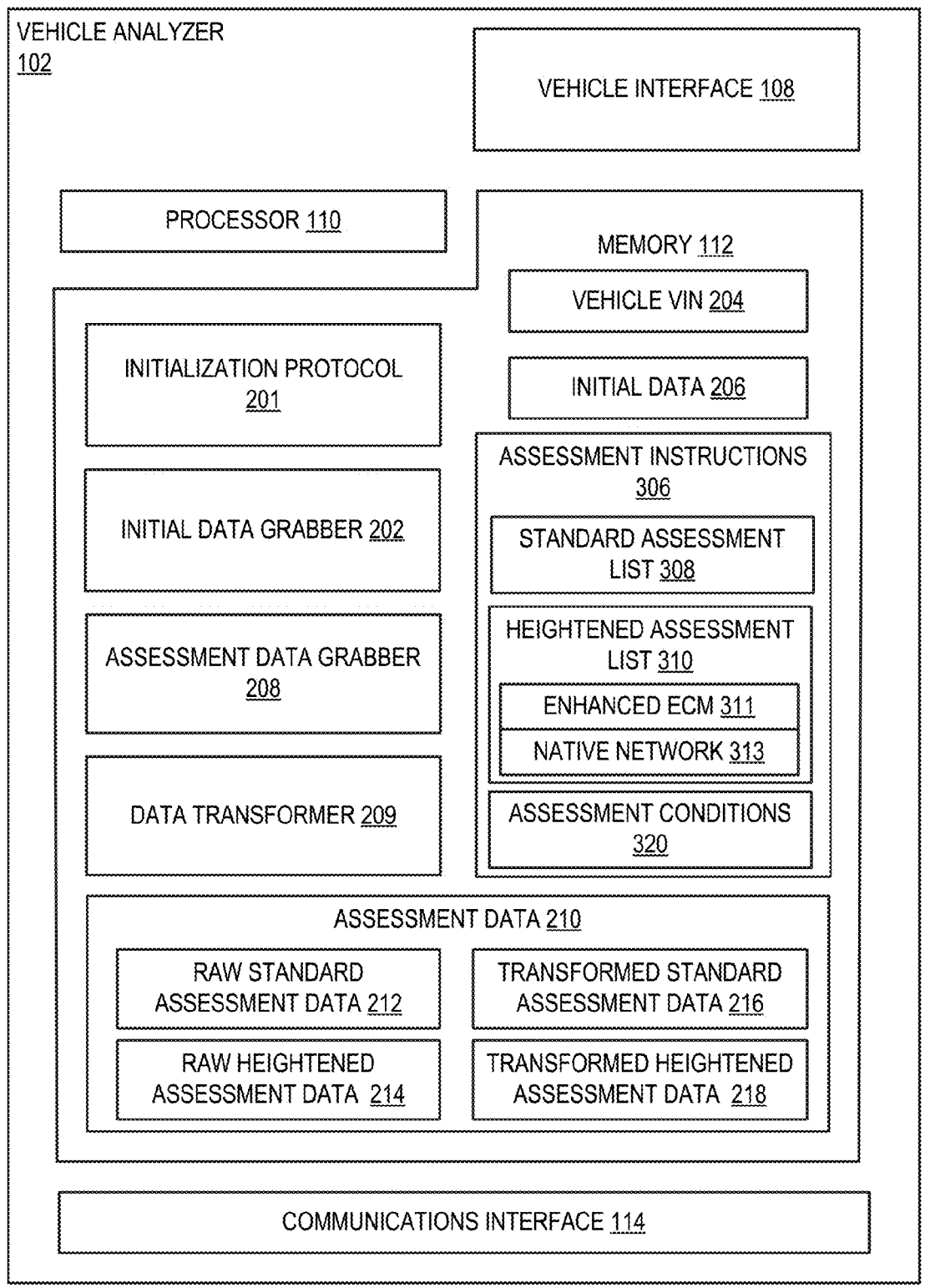
FIG. 2 depicts the vehicle assessment analyzer of FIG. 1 in further detail, in embodiments.
Figure 3:
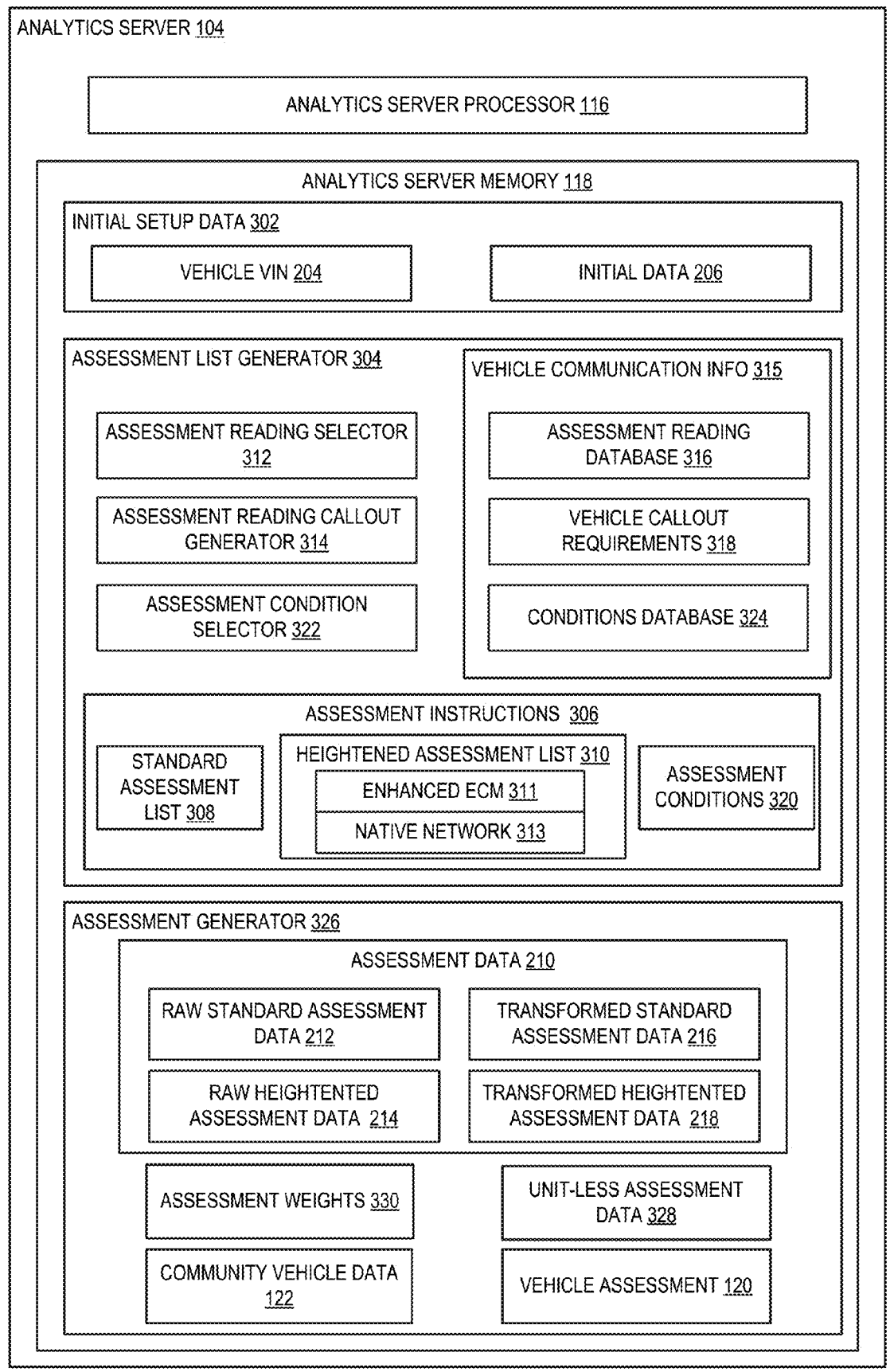
FIG. 3 depicts the vehicle assessment analytics server of FIG. 1 in further detail, in embodiments.

FIG. 1 depicts an exemplary system for vehicle analytic assessment 100, in embodiments. FIG. 2 depicts the vehicle assessment analyzer 102 of FIG. 1 in further detail, in embodiments. FIG. 3 depicts the vehicle assessment analytics server 104 of FIG. 1 in further detail, in embodiments. FIGS. 1-3 are best viewed together with the following description. Of note, the term "exemplary" used herein is not intended to connote a preferred embodiment, or preferred example, but instead indicates that the system or method shown in the figure is merely an example of embodiments disclosed herein.

System 100 includes a vehicle assessment analyzer 102 and a vehicle assessment analytics server 104 for assessing a vehicle 106. Although shown and discussed as a car, it should be appreciated that vehicle 106 may be any vehicle, including, but not limited to: cars, trucks, commercial transports, planes, boats, motorcycles, tractors, construction equipment, semi-tractor trailers, other land engine vehicles (e.g. any land-based vehicle having an on-board-diagnostics (OBD) computer and/or vehicle network communications bus), watercraft, other water engine vehicles (e.g. any water-based vehicle having an on-board-diagnostics computer and/or vehicle network communications bus), pipeline pumps, and compressors. As used herein, vehicle network computer (as well as "OBD network computer") indicates any electronics control module (ECM) controller (or computer), including but not limited to, the powertrain control module, engine control unit (ECU), the transmission control unit (TCU), and any other control unit within the vehicle.

Vehicle assessment analyzer 102 removably couples with vehicle 106 via vehicle interface 108. Vehicle interface 108 may be adapted to physically couple with vehicle 106 via the electronics connector of vehicle 106 or via another connection point or connection protocol. For example, the vehicle interface 108 may couple with vehicle 106 via the standardized OBD (or OBDII, OBDIII, etc.) connector of vehicle 106. Vehicle interface 108 may also be a wireless communication interface such as Bluetooth, WiFi, WLAN (e.g. including but not limited any 802.11 protocol), cellular, LAN, etc. Vehicle interface 108 may include a vehicle network processor, such as an OBD, OBDII, OBDIII, CAN bus, LIN bus, or MOST bus processor that enables communication with the vehicle communication bus. In embodiments, vehicle assessment analyzer 102 is self-powered, or in other embodiments it may connect to the vehicle 106 battery power, chassis ground and other power connection points. In embodiments, by connecting to the OBD connector of vehicle 106, vehicle interface 108 may have a direct connection to both the vehicle computer (e.g. the OBD network computer), as well as the vehicle communication bus. The term "vehicle communication bus" as used herein includes any vehicle bus such as the vehicle controller area network (CAN) bus (including the high speed CAN bus, medium speed CAN bus, and/or low speed CAN bus), the vehicle local interconnect network (LIN) bus, the media oriented systems transport (MOST) bus, as well as other vehicle communication busses. The vehicle communication bus may be an inter-vehicle network coupling each sensor within the vehicle to another sensor and/or the vehicle computer network. In one, non-limiting, example, the vehicle communication bus implements the ISO 15765 CAN standard protocol, or another CAN protocol. Communication via the vehicle communication bus protocol, such as the CAN standard protocol, is discussed in further detail below.

Although discussed above as connecting to a single connector (e.g. the OBD connector), vehicle assessment analyzer 102 may simultaneously connect to vehicle 106 at multiple connection points in embodiments (and by multiple methods, e.g. wireless, wired, Bluetooth, WiFi, Cellular, etc.). Additionally, vehicle assessment analyzer 102 may electrically couple to the OBD network computer, as well as multiple vehicle busses simultaneously without departing from the scope hereof. For example, vehicle assessment analyzer 102 may include a splitter connection such that vehicle assessment analyzer 102 may connect (1) to the OBD network computer and/or the vehicle CAN bus via the OBD connector or another connection point of vehicle 106 which may be directly connected to a connector or tap a wire, and (2) another vehicle network bus (e.g. a LIN bus) via a second connection (for example behind the key switch).

Vehicle assessment analyzer 102 includes a processor 110 in communication with memory 112 storing transitory and/or non-transitory computer readable instructions for executing the functionality of vehicle assessment analyzer 102 discussed in further detail below.

Vehicle assessment analyzer 102 further includes a communications interface 114. Communications interface 114 may be a wired, wireless or Internet communications interface capable of transmitting data to vehicle assessment analytics server 104 via a communication protocol. In embodiments, communications interface 114 may support a wired communication link to the internet. In other embodiments, it may use a wireless link to the internet. For example, communications interface 114 may communicate using one or more of a hardwire Ethernet connection to an internet ISP, WiFi, WLAN (e.g. including but not limited to any 802.11 protocol) cellular, or any wireless RF data technology, Bluetooth, Satellite, RFID, LoRaWan, etc.

Vehicle assessment analytics server 104 includes an analytics server processor 116 in communication with analytics server memory 118 storing transitory and/or non-transitory computer readable instructions for executing the functionality of vehicle assessment analytics server 104. Vehicle assessment analytics server 104 may be in the form of a computer, or bank of computers communicatively coupled together, accessible via the Internet. Vehicle assessment analytics server 104 cooperates with vehicle assessment analyzer 102 to generate vehicle assessment 120 indicating a representative grade of the vehicle 106 based upon data obtained by the vehicle assessment analyzer 102 from vehicle 106 and compared against community vehicle data 122. Community vehicle data 122 includes known and historical data on vehicles in the market place. For example, community vehicle data 122 may include sensor data that has been previously captured by the vehicle assessment analyzer 102 (or other vehicle assessment analyzers), dealer or manufacturer provided data, and any other data surrounding vehicles and the numerous sensors, mechanical systems, and electrical systems utilized therein. In other words, community vehicle data 122 may provide a broad, dynamic and expanding database program to compare the assessed data captured by vehicle assessment analyzer 102 against, to aid in providing a reliable vehicle assessment 120 and as an aid to improving future assessments on vehicles.

In embodiments, as discussed in further detail below, a third party service 124 may access vehicle assessment analytics server 104 to obtain vehicle assessment 120.

Referring to FIG. 2, memory 112 is shown in further detail including an initial data grabber 202 for obtaining the vehicle identification number (VIN) 204 and, in certain embodiments, additional initial data 206 may also be obtained.

Embodiments may additionally include an initialization protocol 201 including transitory and/or non-transitory computer readable instructions that, when executed using processor 110, initialize various components of vehicle assessment analyzer 102. For example, initialization protocol 201 may test communications interface 114 to determine if a communication link can be established between vehicle assessment analyzer 102 and vehicle assessment analytics server 104. Additionally, initialization protocol 201 may test vehicle interface 108 to verify that a communication link between vehicle interface 108 and vehicle 106 can be established. Should vehicle assessment analyzer 102 be unable to establish a communication link to either vehicle 106 and/or vehicle assessment analytics server 104, an error notification such as an audible, visual or tactile notification on the housing of vehicle assessment analyzer 102 may be output indicating such error has occurred. The initialization protocol may also initialize assessment modes on vehicle 106 electrical power train control systems, body control systems, telematics and entertainment buses, and any other electrical components or systems that require initialization prior to assessment.

Initial data grabber 202 comprises computer readable instructions that, when executed by processor 110, access the vehicle computer (e.g. the OBD network computer and/or other vehicle Electronic Control Modules (ECM's)) networks of vehicle 106. For example, when vehicle assessment analyzer 102 is coupled, via vehicle interface 108, with the vehicle 106 and initiated, initial data grabber 202 is executed by processor 110 to query, via initial data request 126 (shown in FIG. 1), the vehicle computer(s) of vehicle 106. Initial data request 126 may be configured according to standard OBD protocols, global, or manufacturer specific callouts to the vehicle computer. In other words, initial data request 126 is adapted to work with any make, model (including year), or manufacturer having a vehicle computer. It should be appreciated that each model may differ for communication protocols to given sensor data in the vehicle. As such, at this stage, initial data grabber 202 is adapted to request data that is typically universal in nature, such as the vehicle VIN.

The vehicle computer of vehicle 106 responds, via initial data response 128 (shown in FIG. 1), by providing the vehicle identification number (VIN) to vehicle assessment analyzer 102. The returned VIN is then stored within memory 112 as vehicle identification number 204 (FIG. 2).

In certain embodiments, initial data request 126 may request vehicle assessment analyzer 102 to request or monitor for additional initial data, and such data may be returned to vehicle assessment analyzer 102 within initial data response 128 and stored within memory 112 as additional initial data 206. Additional initial data 206 may include information such as an odometer reading, an RPM reading (identifying if the car is running), an engine temperature reading, or any other information capable of being generated by monitoring or using direct standard OBD callouts to the computer of vehicle 106.

Upon receipt and storage of vehicle VIN 204, vehicle assessment analyzer 102 transmits, via a communication interface, an initial data packet 130 (FIG. 1) to vehicle assessment analytics server 104, including vehicle VIN 204. If additional initial data 206 is obtained, then initial data packet 130 may include such additional initial data 206 as well. Vehicle assessment analytics server 104 then stores said vehicle VIN 204 (and, if included, additional initial data 206) within initial setup data 302 (FIG. 3).

As shown in FIG. 3, vehicle assessment analytics server 104 further includes an assessment list generator 304. Assessment list generator 304 comprises computer readable instructions, stored on a transitory and/or non-transitory computer readable medium, that, when executed by analytics server processor 116, operate to generate assessment instructions 306. Assessment instructions 306 include assessment readings according to a plurality of modules, control steps, testing steps, and/or configuration blocks for configuring vehicle assessment analyzer 102 to assess vehicle 106. Assessment readings as used herein relates to various queries or monitoring done on specific vehicle components. Assessment instructions 306 include at least one of standard assessment list 308, and heightened assessment list 310 and may be changed or modified at any time by automatic update from the community vehicle data 122 or manually within vehicle assessment analytics server 104.

Standard assessment list 308 defines one or more assessment readings to be performed by vehicle assessment analyzer 102 on vehicle 106 by communicating directly with the vehicle computer(s) of vehicle 106. Standard assessment list 308 defines assessment readings that control the vehicle assessment analyzer 102 to monitor and/or query the vehicle computer for information via standard OBD callouts to the vehicle control ECM(s) (e.g. OBD network computer). In embodiments, standard assessment list 308 includes assessment readings to be run on the $O_2$ sensor(s), the Manifold Absolute Pressure (MAP), Throttle Position Sensors (TPS), standard Diagnostic Trouble Codes (DTC), etc. Standard assessment list 308 may be, but is not limited to, primarily emission based data. In embodiments, standard assessment lists 308 include ECM (e.g. OBD network computer) callouts (e.g. data bits) that are common among multiple types of vehicles (e.g. common manufacturers, or all vehicles in general).

Heightened assessment list 310 defines one or more assessment readings to be performed by vehicle assessment analyzer 102 on vehicle 106 that are specific to the vehicle 106 or the vehicle manufacturer and are not part of the standardized OBD diagnostic data sets. Heightened assessment list 310 may include one or more of enhanced ECM list 311 and native vehicle network list 313. Enhanced ECM list 311 defines assessment readings and parameters thereof to be performed by vehicle assessment analyzer 102 by communicating with one or more of the vehicle ECM(s) (e.g. OBD network computer) directly. Enhanced ECM list 311 differs from standard list 311 in that many of the enhanced ECM callouts (e.g. data bits) are non-standard, not published, and/or proprietary in nature, and may be manufacturer specific down to the make, year, and/or model of vehicle, its engine (electric or hydrocarbon) and type transmission of vehicle 106. Enhanced ECM list 311 may include various "modes" (e.g. any one or more of OBD modes 1-22), and custom commands in certain embodiments, particularly those in which the vehicle network computer executes a built-in assessment reading profile to test the vehicle allowing the vehicle assessment analyzer to then obtain a variety of information with one or multiple requests. This might include but is not limiting in scope to assessment readings that could include odometer, time the MIL light was illuminated, fuel levels and consumption, transmission clutch pressures, internal transmission sensors or internal engine oil pressures over time ($\Delta t$) for example.

Native vehicle network list 313 defines assessment readings performed by vehicle assessment analyzer 102 by communicating directly with the vehicle communication bus (e.g. a CAN, LIN, or MOST bus) of vehicle 106. Native vehicle network list 313 controls vehicle assessment analyzer 102 to communicate (via receiving or transmitting communication packets) with individual sensors within vehicle 106 to retrieve information that is not readily accessible via the vehicle computer. That is, native vehicle network list 313 configures vehicle assessment analyzer 102 with particular assessment information specific to the particular vehicle as determined from vehicle VIN 204 and may include the community vehicle data 122 on the vehicle assessment analytics server. In embodiments, native vehicle network list 313 includes filters that configure the vehicle network processor within vehicle interface 108 to filter out unwanted data on the vehicle communication bus. In other words, native vehicle network list 313 configures vehicle assessment analyzer 102 to listen to all data communications on the vehicle communication bus, and capture signals being transmitted from the specific sensor or electronic system that are of importance to the specific test. For example, native vehicle network list 313 may require vehicle assessment analyzer 102 to log communications from a given sensor as it transmits dynamic status updates during its regular course of operation while vehicle 106 is running and ignore communications on the vehicle communication bus that are not from that given sensor.

In embodiments, heightened assessment list 310 includes assessment readings to be run on the odometer, fuel level, a variety of sensor status real time data, transmission and engine fluid, clutch pressures, temperatures, and other direct access to read the sensors and electrical systems within the vehicle 106.

Standard assessment list 308 and heightened assessment list 310 are generated within assessment list generator 304 using assessment reading selector 312 and assessment reading callout generator 314.

Assessment reading selector 312 includes computer readable instructions stored on a transitory and/or non-transitory computer readable medium, that, when executed by analytics server processor 116, analyze vehicle VIN 204 to identify the make, model, and manufacturer of vehicle 106. Assessment reading selector 312 uses these vehicle characteristics and may use the community vehicle data 122 to select one or more assessment readings from an assessment reading database 316 that are to be performed by vehicle assessment analyzer 102. Where additional initial data 206 includes additional information about vehicle 106, such as mileage for example, assessment reading selector 312 may utilize such information to configure standard assessment list 308 and heightened assessment list 310. For example, assessment reading selector 312 may select different assessment readings for a given model of vehicle 106 with over 50,000 miles as compared to assessment readings selected for the same model of vehicle 106 with only 10,000 miles.

It should be appreciated that assessment reading selector 312 may select any number of assessment readings for a given vehicle. For example, the assessment reading selector 312 may identify specific sensors of the vehicle to assess, as well as the number of times to assess each respective sensor, as well as the interval between each assessment reading of each respective sensor. Each assessment reading requirement is then specified in the respective standard assessment list 308 and heightened assessment list 310.

Assessment reading callout generator 314 includes computer readable instructions stored on a transitory and/or non-transitory computer readable medium, that when executed by analytics server processor 116, generate standard assessment list 308 and heightened assessment list 310 based upon the assessment readings selected by assessment reading selector 312 and vehicle callout requirements 318. Each make, model, and manufacture of vehicle may include a different communication code(s) and methods for communicating with the vehicle computer (e.g. the OBD network computer), other ECM(s), and other sensors directly via the vehicle communication bus (e.g. the CAN bus). Vehicle callout requirements 318 includes a database of the requirements for communicating with a given sensor for a given make, model, and manufacture of vehicle.

In certain embodiments, assessment instructions 306 may further include assessment conditions 320. Assessment conditions 320 define requirements that vehicle 106 must satisfy prior to assessment of vehicle 106 by vehicle assessment analyzer 102. For example, assessment conditions 320 may require the vehicle engine to be at a given temperature prior to vehicle assessment analyzer 102 performing certain assessment readings of vehicle 106. As another example, assessment conditions 320 may require the vehicle engine to be operating at a certain RPM and under a certain load prior to vehicle assessment analyzer 102 executing certain assessment readings. Therefore, vehicle 106 may be located on a dynamometer and controlled, for example according to assessment conditions 320, to change engine RPM and loads for specific settings and durations during assessment by vehicle assessment analyzer 102. Assessment condition selector 322 includes computer readable instructions stored on transitory and/or non-transitory computer readable medium that, when executed by analytics server processor 116, select one or more assessment conditions from conditions database 324 to generate assessment conditions 320. Conditions database 324 includes one or more conditions required for each vehicle make, model, and manufacture.

FIGS. 4A-4B depict exemplary information tables 400, 450 including information for generating vehicle assessment list 306, and analyzing the captured vehicle assessment readings from vehicle 106, in embodiments. In FIG. 4A, table 400 shows exemplary information utilized for generating standard assessment list 308 and enhanced ECM list 311, in embodiments. In FIG. 4B, table 450 shows exemplary information utilized for generating native vehicle network list 313, as well as for transforming the raw data into useable data for generating vehicle assessment 120, in embodiments.

Table 400 may be stored either within memory 112 of vehicle assessment analyzer 102, for example when standard assessment list 308 is stored within vehicle assessment analyzer 102, and/or within analytics server memory 118, for example to be utilized by assessment list generator 304 to generate assessment lists 308 and/or 311 and by data transformer 209 and/or assessment generator 326 to transform and decode, respectively, various aspects of the captured data from vehicle assessment analyzer 102.

Table 400 includes one or more columns including: parameter description 402, parameter ID 404, units 406, transmission ID 408, receiving ID 410, service ID 412, controller ID 414, is heightened 416 and function 418.

Parameter description 402 contains human readable description of the sensor or system being readout by vehicle assessment analyzer 102 from the ECM for the requested parameter ID. Parameter description 402 may or may not be transmitted to the vehicle assessment analyzer 102 as it is used as needed to generate the vehicle assessment 120.

Parameter ID 404 determines the exact sensor or system (e.g. "parameter") being requested and answering from the ECM (e.g. the OBD network computer) as determined by the particular assessment reading being performed by the vehicle assessment analyzer 102.

Units 406 describes the unit of measure for the response data for human readable labels. The units 406 may not reflect the unit of measure of the data, but the result after transformation by data transformer 209.

Transmission ID 408 defines the vehicle communication bus message ID directing the ECM (e.g. OBD vehicle network computer) to contact a particular parameter based on the particular assessment reading being performed by the vehicle assessment analyzer 102.

Receiving ID 410 defines the vehicle communication bus message ID sent back from the particular message in response to a transmitted transmission ID 408 message.

Service ID 412 identifies the ECM "mode" (e.g. what type of requested data-current state, previous state, etc.) to which the given assessment reading is being made. For example, service ID 412 may identify an OBD vehicle network computer mode (e.g. any mode including 3, 6, 22, etc.) to which the request commensurate with the given assessment reading is being made. In certain embodiments, the service ID 412 may be an industry standard value determined by the particular ECM (e.g. OBD vehicle network computer) being targeted as determined by the controller ID 414.

Controller ID 414 defines the particular ECM that the vehicle assessment analyzer 102 is to contact to make a particular assessment reading. This value may be used by processor 110 to determine which ECM is to be sent an assessment reading. In certain cases, where vehicle analyzer 102 is connected to multiple ECMs via multiple connection points, controller ID 414 may be utilized by processor 110 to determine which connection point to transmit the assessment reading on.

The heightened column 416 is used by one or both of the vehicle assessment analyzer 102 and the vehicle assessment analytics server 104 to determine if the particular sensor or assessment being run thereon is a standard assessment or an heightened assessment.

Function 418 is used by one or both of the vehicle assessment analyzer 102 and the vehicle assessment analytics server 104 to categorize the function of the assessment reading being made. In one example, the vehicle assessment analyzer 102 is agnostic—that is the vehicle assessment analyzer 102 does not comprehend what assessment readings are being made, and how they affect the overall vehicle assessment 120. Instead, vehicle assessment analyzer 102 transmits assessment data 210 (as one or more of raw standard assessment data 212, raw heightened assessment data 214, transformed standard assessment data 216, and transformed heightened assessment data 218) and associates such data with a function ID 418 such that vehicle assessment analytics server 104 can differentiate what data is being transmitted from the vehicle assessment analyzer 102. Assessment data as used herein relates to information sent from a vehicle component in response to, or as monitored by, an assessment reading. Vehicle assessment analytics server 104 may utilize function ID 418 to determine which assessment weights 330 to apply to a given data set for a given assessment. Each specific sensor, no matter the vehicle, may be associated with a different function ID 418.

Table 400 shows three exemplary sensors. It should be appreciated that table 400 may show any number of sensors depending on the vehicle, manufacturer, make, model, etc. Items in Table 400 require that the vehicle assessment analyzer 102, make requests to a vehicle controller to receive a sensor reading. An example transmission of an assessment reading on the odometer, as shown in table 400 would look as follows: 000007E0 03221123 00000000. Each digit in the data stream represents a 4-bit hexadecimal number, also known as a "nibble" and two digits together represents an 8-bit byte. The first four bytes correspond to the transmission message ID 408 for the vehicle network computer (e.g. OBD network computer) request, "07E0". The first byte of the second 32-bit word includes an always zero placeholder and, a "3" indicating the number of bytes in the remainder of the message. The next byte is the service ID (or OBD mode) indicating the context of the request. The service ID "22" indicates an enhanced request. The following two bytes indicates "1123" as the parameter ID (PID) 404 of the current odometer value being requested. The following 32-bit word of "00000000" indicates a placeholder for the transmitted message consistent with the standard CAN messaging format. It should be appreciated, however, that the format and length of each word may vary based on the particular vehicle network communications bus protocol being implemented and accessed. A return signal from the odometer may look as follows: 000007E8 07221123 00001011. The first four bytes correspond to the receiving message ID 410 from the OBD controller. The second 32-bit number has three parts, as did the request. The first byte includes a placeholder "0", a "7" indicating the number of bytes remaining in the message. The next byte echoes the service ID (OBD mode), in this case "22". The two-byte parameter ID follows and it also echoes the value from the request. In this example, "1123" as the parameter ID 404 of the odometer being requested. The length of the mode and the PID is 3 bytes, leaving 4 bytes for the value of the requested parameter. The following 4 bytes indicates "00001101" as the returned raw value from the odometer requested. Depending on the constraints of the particular ECM or vehicle network communications bus being accessed, more or fewer "words," having the same, more or fewer bits, may be utilized. Moreover, the specific data used herein and shown within tables 400 and 450 are exemplary only, and such particular values may differ depending on the vehicle, communication protocol being accessed, manufacturer, make, model, year, etc.

Table 450 represents recognition and transformation information about vehicle messages being actively passed between vehicle controllers during the operation of the vehicle. This information can be valuable in assessing the condition of the engine, drive train and electrical sensors/systems of the vehicle. Table 450 may be stored either within memory 112 of vehicle assessment analyzer 102, for example when standard assessment list 308 is stored within vehicle assessment analyzer 102, and/or within vehicle assessment analytics server memory 118, for example to be utilized by assessment list generator 304 to generate the native vehicle network list 313 and/or assessment generator 326 to transform and decode, respectively, various aspects of the captured data from vehicle assessment analyzer 102. Since the interchange of messages between vehicle controllers may be manufacturer, make, mode and year specific and the vehicle assessment analyzer 102 is vehicle agnostic, the items for Table 250 may be obtained from the server as native vehicle network list 313 explained above. The assessment data grabber 208 monitors the vehicle network for the specific Message IDs on the vehicle's network associated with the assessment list.

Table 450 includes one or more columns including: parameter description 452, message ID 454, units 456, multiplex mask 458, multiplex value 460, endian 462, bit position 464, bit count 466, pre-scale offset 468, scale factor multiplier 470, scale factor divisor 472, scale factor offset 474 and function 476.

Parameter description 452 is similar, and may be the same as, parameter description 402 and contains human readable description of the sensor or system being readout by vehicle assessment analyzer 102 from the ECM for the requested parameter ID. Parameter description 452 may or may not be transmitted to the vehicle assessment analyzer 102 as it is used as needed to generate the vehicle assessment 120.

Message ID 454 identifies the contents and/or format of the native vehicle communication bus message. Message ID 454 may be utilized by the vehicle network processor within vehicle interface 108 to set message acceptance filters for which vehicle communication bus messages are captured and analyzed by vehicle assessment analyzer 102.

Units 456 is similar (and may be the same as) units 406 and describes the unit of measure for the response data for human readable labels. The units 456 may not initially reflect the unit of measure of the data, but the result after transformation by data transformer 209.

Multiplex mask 458 identifies that some messages, even though they share the same message ID 454, may contain different pieces of information depending on the setting of bits within the data value section of the packet being communicated along the vehicle communication bus. As such, multiplex mask indicates which bits in the message indicate the actual context of the data within the transmitted message along the vehicle communication bus.

Multiplex value 460 may be used, by one or both of assessment data grabber 208 and assessment generator 326, in conjunction with the multiplex mask 458 to match the bits indicated by the multiplex mask 458 to the resulting bit values to determine if the message context is the desired one for assessment reading.

Endian 462 indicates the byte order of the transmitted message. Endian may indicate "0" for big endian, and "1" for little endian.

Bit position 464 indicates the bit position of the transmitted message that indicates the starting value for the information of interest. In other words, a transmitted message on the vehicle communication bus may include a variety of bits having non-relevant information. Bit position 464 indicates where the relevant information begins within a given transmitted message.

Bit count 466 indicates how many bits of information are relevant. Therefore, bit count 466 may be used, by one or both of assessment data grabber 208 and assessment generator 326, in conjunction with bit position 464 to identify the starting position and number of relevant bits required to obtain the relevant information for a given assessment reading.

Preset offset scale 468, scale factor multiplier 470, scale factor divisor 472, and scale factor offset 474 may be utilized, by one or both of data transformer 209 and assessment generator 326, to transform raw data into transformed readable data (e.g. transformed heightened assessment data 218) representing real values. This readable data may then be averaged or transformed in via other transform operations, as discussed below, during generation of the vehicle assessment 120.

Pre-scale offset 468 indicates that the raw data transmitted on the vehicle communication bus may be encoded to fit into as few bits as possible. The pre-scale offset 468 value is a value to add to or subtract from the raw data to bring the value to a new value before applying scale factors. For example, with regards to temperatures, the preset scale offset 468 may indicate to subtract 40 to bring the starting temperature to the C/F/base of −40 before scaling the value to the required units of measure.

Scale factor multiplier 470 is used to multiply the raw data to achieve the true value of the data. For example, the raw data may be encoded to fit into as few bits as possible and the scale factor multiplier 470 expands the raw data to provide true values.

Scale factor divisor 472 works similarly as scale factor multiplier 470 but is used to divide the data, for example when a fractional ratio of the raw to true data is required.

Scale factor offset 474 requires some values to have a final offset to transform the raw data into the true data.

Function 476 is similar to function 418 and is used by one or both of the vehicle assessment analyzer 102 and the vehicle assessment analytics server 104 to categorize the function of the assessment being made. Function 476 may be a continuation of function 418 such that each parameter, either standard list 308, enhanced ECM list 311 or native vehicle network list 313 can respectively be associated with a different function.

The raw data on a vehicle communication bus may, using table 450, be converted into real, usable data to generate assessment 120. There are two "odometers" shown in table 450, each from a different manufacturer/make/model of vehicle. As such, the data for each is different. Moreover, the function ID 476 is different (one may be tenths of Km and the other tenths of Miles, for instance) which allows the assessment generator 326 to categorize the appropriate weights 330 thereto. Moreover, there are three "tire pressure" entries having the same message ID. A single "message" travelling on the vehicle communication bus may contain data for all three of these tire pressure sensors, which is why the message ID 454 is "0x011F" for all three entries. However, the raw data can be categorized by a specific sensor based upon the respective bit position 464 and bit count 466. For example, each bit count 466 for each of the three tire pressures is "4" bits. However, the bit position 464 starts at $12^{th}$, $16^{th}$, or $20^{th}$ bit of the message indicated by message ID 454 "0x011F" along the vehicle network. Thus, to obtain a readout for the first tire pressure, one would find the message having message ID "0x011F", and use the four bits starting from the $12^{th}$ bit in the message. This may then be scaled according to the offset 468, multiplier 470, divisor 472 and scale offset 474 to transform the raw data into a useable, transformed, value.

Referring back to FIG. 1, after assessment list generator 304 generates assessment instructions 306, including standard assessment list 308 and heightened assessment list 310 (and in certain embodiments assessment conditions 320), the assessment instructions 306 are transmitted wirelessly, or via a wired connection, as assessment list communication 132 from vehicle assessment analytics server 104 to vehicle assessment analyzer 102. Assessment instructions 306 are then stored within memory 112 of vehicle assessment analyzer 102.

By creating assessment instructions 306 at the vehicle assessment analytics server 104, vehicle assessment analyzer 102 may be vehicle agnostic and is capable of analyzing specific assessable components of any vehicle make and model, or type. Further, the specific assessment readings may be selected partly based upon community vehicle data 122. Community vehicle data 122 may be subjected to a "machine learning" data update process such that the community vehicle data 122 may be changed after each input and use logic based on each successive input to make better future assessment readings as more community vehicle data 122 is obtained. For example, machine learning analysis may identify trends within community vehicle data 122 as more and more data is added thereto. This machine learning substantially increases the effectiveness, veracity, and flexibility of the system. This is a significant advantage over other test devices that are task specific to a single make and model of vehicle. This significantly increases the flexibility of the test and vehicles that the vehicle assessment analyzer is able to analyze, while significantly reducing the memory and increasing the speed of the device. Vehicle assessment analytics server 104 may be updated, modified, or otherwise altered to add any vehicle or new assessment readings data parameters to its database anytime, thereby also allowing vehicle assessment analyzer 102 to assess these added vehicles without modification. This significantly reduces the costs and increases the market that the vehicle assessment analyzer 102 serves. Moreover, this system 100 changes the standard vehicle inspection process for sales of vehicles as the vehicle need not be transported to another location for personal inspection by the buyer, or the buyer's representative, but instead the inspection may be completed entirely electronically and transmitted to the buyer in a reliable manner by a reliable third party. Moreover, unlike typical inspection processes, the vehicle assessment analyzer 102 is capable of accessing all, or substantially all, of the electronic sensors coupled to the vehicle communication bus (e.g. CAN bus) and thus vehicle assessment analyzer 102 may perform a much more complex and comprehensive multi-point inspection. Further yet, the inspection performed by the vehicle assessment analyzer 102 is more trustworthy than a typical, in-person, inspection because the vehicle assessment analyzer 102 is not subjective in its analysis. In other words, the assessment by vehicle assessment analyzer 102 may be purely objective in that it is purely evidence based and data driven, as opposed to subjective "point" inspections performed by a human. As such, there is no subjective analysis involved.

Once the assessment instructions 306 are obtained from vehicle assessment analytics server 104 by vehicle assessment analyzer 102, assessment data grabber 208 operates to monitor and/or query the vehicle 106 based upon assessment instructions 306. Assessment instructions 306 may include one or more of: which vehicle communication network to read (e.g. high speed CAN, medium speed CAN, low speed CAN, LIN, MOST or OBD network), baud rate to communicate (e.g. 500K, 125K baud), network timing bias, and any other instructions necessary to enable vehicle assessment analyzer 102 to communicate with ECM and computer components of vehicle 106. Assessment data grabber 208 includes transitory and/or non-transitory computer readable instructions that, when executed by processor 110, operate to send an assessment data request 134 to vehicle 106, based upon assessment instructions 306. Assessment data request 134 includes performing each standard assessment reading within standard assessment list 308 and heightened assessment reading within heightened assessment list 310. If included, assessment data request 134 may or may not be sent until each assessment condition 320 is met depending on general assessment instructions 306 sent from vehicle assessment analytics server 104 to analyzer 102.

Multiple assessment data requests 134 may be sent based upon the requirements of assessment instructions 306. For example, if standard assessment list 308 indicates to query an oxygen ($O_2$) sensor of the vehicle 106 twenty times at 5 second intervals, then twenty assessment data requests 134 are transmitted from vehicle assessment analyzer 102 to vehicle 106. If heightened assessment list 310 indicates to query a specific sensor, for example the automatic transmission clutch pressure sensor, ten times at 1 second intervals, then an additional ten assessment data requests 134 will be sent from vehicle assessment analyzer 102 to vehicle 106.

In response to each assessment data request 134, vehicle 106 will return an assessment data response 136. Assessment data response 136 is a response from either the vehicle network computer or from an individual sensor within vehicle 106, depending on the nature of the assessment data request 134. Each assessment data response 136 is stored as assessment data 210 (FIG. 2). Assessment data 210 includes one or more of raw standard assessment data 212, raw heightened assessment data 214, transformed standard assessment data 216, and transformed heightened assessment data 218.

Raw standard assessment data 212 includes the raw data transmitted as an assessment data response 136 in response to an assessment data request 134 transmitted pursuant to a standard assessment within standard assessment list 308. As used herein, "raw" may include binary or hexadecimal data responses. Raw data may also include binary or hexadecimal data responses that have been converted into a unit value (e.g. if the sensor sends a hexadecimal data response corresponding to a given voltage level, the raw data may represent the given voltage level instead of the hexadecimal response).

Raw heightened assessment data 214 includes the raw data transmitted as an assessment data response 136 in response to an assessment data request 134 transmitted pursuant to an heightened assessment reading within heightened assessment list 310.

Transformed standard assessment data 214 includes raw standard assessment data 212 that has been manipulated, or "transformed" via processor 110 executing data transformer 209. Data transformer 209 includes computer readable instructions, stored on a transitory or non-transitory computer readable medium, that, when executed by processor 110, transform the raw data into transformed data as follows. In an embodiment, transformed standard assessment data 216 may include an average of the collective raw standard assessment data 212 corresponding to a particular sensor. For example, where an $O_2$ sensor is queried twenty times pursuant to standard assessment list 308, transformed standard assessment data 216 may include the average of each of those twenty queries. Additionally, transformed data may include distributions of data such as an average of each of those twenty queries of the $O_2$ sensor segmented based on temperature (e.g. low, medium, and high temperature assessment readings as the vehicle is warming up during analyzing by vehicle assessment analyzer 102). Data may also be segmented or distributed based on oil pressure changes during analyzing vehicle 106. Any data distribution/segmentation may be utilized herein without departing from the scope hereof. The transformed data is not limited to just averages, but may include medians, standard deviations, or other transforms without departing from the scope hereof.

Transformed heightened assessment data 218 includes raw heightened assessment data 214 that has been manipulated, or "transformed" in similar manner as discussed above with respect to transformed standard assessment data. In an embodiment, transformed heightened assessment data 218 may include an average of the collective raw heightened assessment data 214 corresponding to a particular sensor.

After all assessment instructions 306 have been completed by vehicle assessment analyzer 102 and assessment data 210 has been stored within memory 112, vehicle assessment analyzer 102, via communications interface 114, transmits assessment data 210 to vehicle assessment analytics server 104 as assessment data packet 138 (FIG. 1) and said assessment data 210 is stored within analytics server memory 118. In some embodiments, only raw standard assessment data 212 and raw heightened assessment data 214 are transmitted as assessment data packet 138, and the raw data is transformed respectively into transformed standard assessment data 216 and transformed heightened assessment data 218 at vehicle assessment analytics server 104. In other embodiments the raw data packets are pre-transformed prior to transmission into transformed data packets in the vehicle assessment analyzer.

As shown in FIG. 3, vehicle assessment analytics server 104 includes an assessment generator 326. Assessment generator 326 may include computer readable instructions stored on transitory or non-transitory computer readable medium that, when executed by analytics server processor 116, generate vehicle assessment 120. Assessment generator 326 may convert one or more of raw standard assessment data 212, raw heightened assessment data 214, transformed standard assessment data 216, and transformed heightened assessment data 218 into unit-less assessment data 328. Unit-less assessment data 328 includes a score for each included data point within raw standard assessment data 212, raw heightened assessment data 214, transformed standard assessment data 216, and transformed heightened assessment data 218. The data point may be unit-less based upon comparing the unit value of the data point against reference values within community vehicle data 122. For example, if an $O_2$ sensor at optimal performance returns a value of 2.5 Volts, and the data point within transformed standard assessment data 216 includes an average O2 sensor value of 2 Volts, then the unit-less assessment data 328 value may be a 3 on a scale of 0-10. Therefore, unit-less assessment data 328 acts to normalize values from various sensors that each utilize different units for generation of vehicle assessment 120.

In embodiments, to generate vehicle assessment 120, each unit-less assessment data 328 data point may be assigned a weight, based upon assessment weights 330, indicating the importance of that data point within vehicle assessment 120. For example, the odometer reading may be of particular importance for a certain vehicle (e.g. a given vehicle's performance decreases significantly at 123,000 miles). Also, for the same vehicle, the engine oil pressure reading may have little to no impact on the vehicle performance. Therefore, the weight for an odometer reading may be higher than the weight for the engine oil pressure reading. Assessment weights 330 identifies the weight of each unit-less assessment data 328 data point that is to be assigned to create that vehicle's vehicle assessment 120.

In embodiments, upon creation of vehicle assessment 120 assessment data 210 is stored in community vehicle data 122 as a historical data point. By saving community vehicle data 122, the vehicle assessment analytics server 104 is capable of adapting and machine learning on the fly by analyzing and reanalyzing the historical data within community vehicle data 122. For example, if enough data points are logged within community vehicle data 122, the system may learn that a trend for a certain vehicle model occurs when that vehicle reaches 164,500 miles, such as engine failure. Therefore, the assessment readings for future vehicles matching that model may include this trend within the assessment weights 330.

Figure 5:
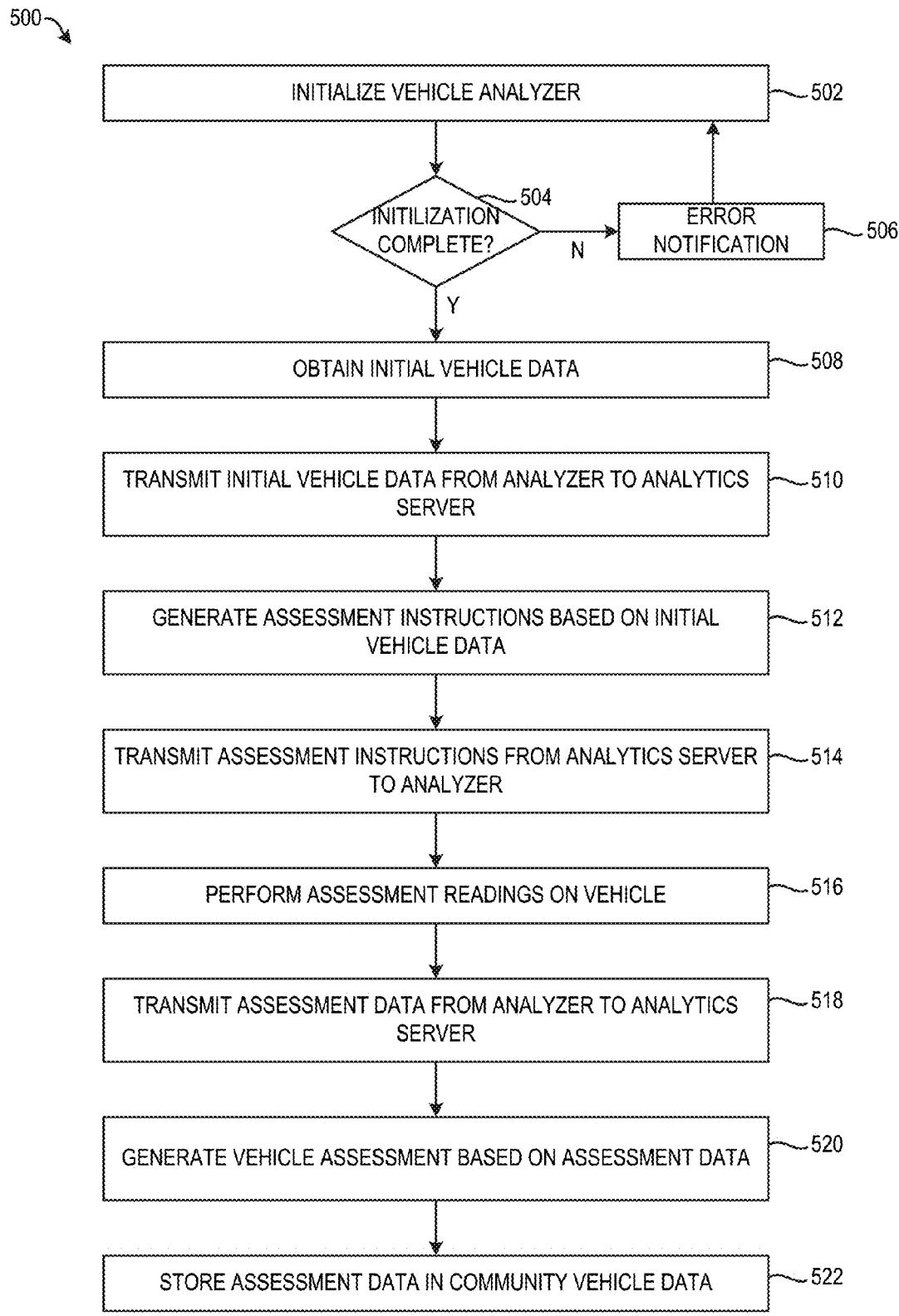
FIG. 5 depicts an exemplary method for generating a vehicle assessment, in embodiments.

FIG. 5 depicts an exemplary method 500 for generating a vehicle assessment, in embodiments. Method 500 may be implemented using system 100, described above with reference to FIGS. 1-4.

In embodiments, method 500 includes step 502 of initializing the vehicle assessment analyzer. In one example of step 502, initialization protocol 201 of vehicle assessment analyzer 102 determines whether communications interface 114 can make a communication link to vehicle assessment analytics server 104. In another example of step 502, which may alternately or additionally occur to the above example, initialization protocol 201 determines if vehicle interface 108 can establish a communication link with vehicle 106. In embodiments including step 502, method 500 proceeds to decision 504. In embodiments without step 502, method 500 begins with step 508.

In decision 504, method determines if the initialization of step 502 is complete. In one example of decision 504, initialization is complete when a communication link is made between vehicle assessment analyzer 102 and one or both of vehicle assessment analytics server 104 and vehicle 106. If initialization is complete, then method 500 proceeds with step 508. If initialization is not complete, method 500 proceeds either with step 506, if included, or repeats step 502.

In step 506, method 500 generates an error notification. In one example of step 506, an audible, visual, or tactile error notification is presented at the housing of vehicle assessment analyzer 102 informing a user that one or both communication links between vehicle assessment analyzer 102 and vehicle assessment analytics server 104 and/or vehicle 106 could not be made. Method 500 then proceeds with repeating step 502.

In step 508, method 500 obtains initial vehicle data. In one example of operation of step 508, vehicle assessment analyzer 102, using processor 110, executes initial data grabber 202 to obtain vehicle VIN 204 from the vehicle computer of vehicle 106. Additionally, in certain embodiments, during step 508, initial data grabber 202 may obtain additional initial data 206. Method 500 then proceeds with step 510. In certain embodiments, if the vehicle 106 is not turned on prior to step 108, method 500 may output a notification such as an audible, visual, or tactile notification to start the vehicle 106.

In step 510, method 500 transmits initial vehicle data from the vehicle assessment analyzer to a vehicle assessment analytics server. In one example of step 510, vehicle assessment analyzer 102, via communications interface 114, transmits one or both of vehicle VIN 204 and additional initial data 206 (if obtained during step 508) to vehicle assessment analytics server 104 as initial data packet 130. Method 500 then proceeds with step 512.

In step 512, method 500 generates assessment instructions based upon the initial vehicle data transmitted during step 510. In one example of step 512, assessment list generator 304 generates assessment instructions 306. Additional details of step 512 are discussed below with respect to FIG. 6. Method 500 then proceeds with step 514.

In step 514, method 500 transmits assessment instructions from vehicle assessment analytics server to vehicle assessment analyzer. In one example of step 514, vehicle assessment analytics server 104 transmits assessment instructions 306 to vehicle assessment analyzer 102. Vehicle assessment analytics server 104 may transmit one or more of standard assessment list 308, enhanced ECM list 311, and native vehicle network list 313. In certain embodiments, standard assessment list 308 is preloaded into the firmware of vehicle assessment analyzer 102 such that one or both of enhanced ECM list 311, and native vehicle network list 313 are transferred to vehicle assessment analyzer 102 during step 514. Method 500 then proceeds to step 516.

In step 516, method 500 performs assessment readings on the vehicle using the vehicle assessment analyzer. In one example of step 516, processor 110 of vehicle assessment analyzer 102 executes assessment data grabber 208 to obtain assessment data 210 from vehicle 106. Additional details of step 516 are discussed below with respect to FIG. 7. Method 500 then proceeds to step 518.

In step 518, method 500 transmits, via wired or wireless communication, assessment data from the vehicle assessment analyzer to the vehicle assessment analytics server. In one example of step 518, vehicle assessment analyzer 102, via communications interface 114, transmits assessment data 210 as assessment data packet 138 to vehicle assessment analytics server 104. Method 500 then proceeds to step 520.

In step 520, method 500 generates a vehicle assessment based on the assessment data transmitted in step 518. In one example of step 520, vehicle assessment analytics server 104, via analytics server processor 116, executes assessment generator 326 to generate vehicle assessment 120. Additional details that may be included in step 520 are discussed below with respect to FIG. 8. Method 500 then proceeds with step 522.

In embodiments including step 522, method 500 stores assessment data in the vehicle assessment analytics server as community vehicle data. In one example of step 522, assessment data 210 is stored in vehicle assessment analytics server 104 as community vehicle data 122 and used to identify trends in the performance operation of various vehicles.

Figure 6:
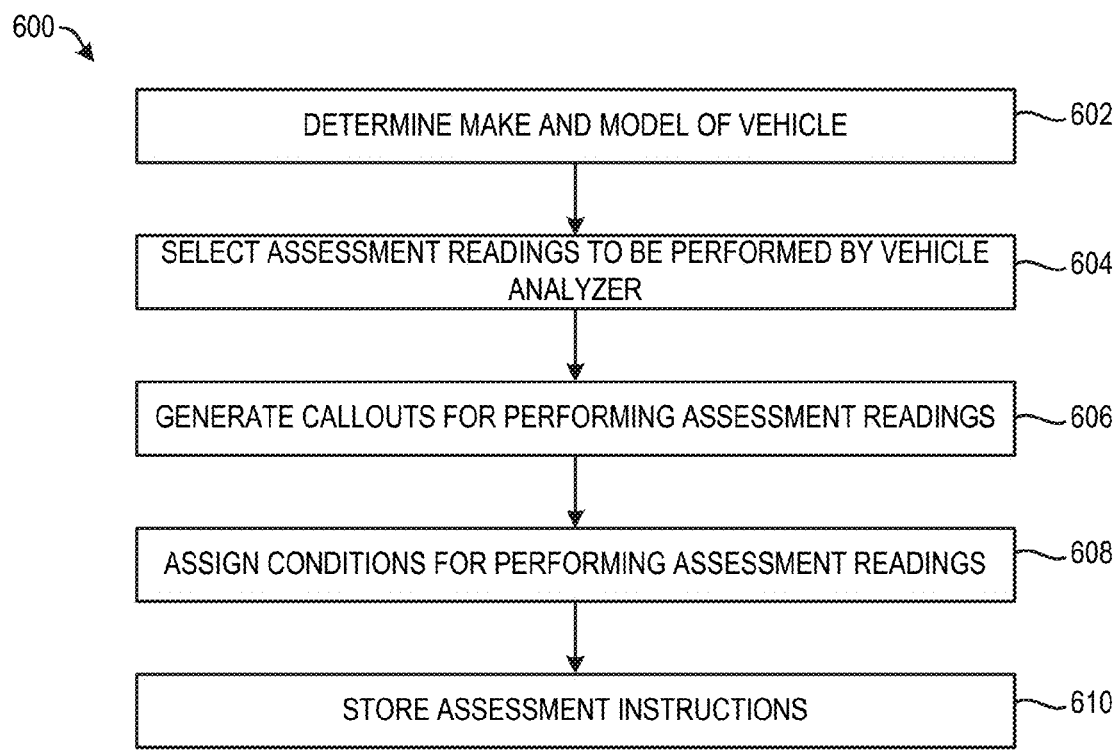
FIG. 6 depicts an exemplary method for generating assessment instructions, in embodiments.

FIG. 6 depicts an exemplary method 600 for generating assessment instructions, in embodiments. Method 600 provides additional details of embodiments of step 512 of method 500 of FIG. 5, discussed above. Method 600 is for example performed via assessment list generator 304 of vehicle assessment analytics server 104.

In step 602, method 600 determines the make and model of the vehicle. In one example of step 602, analytics server processor 116 executes assessment reading selector 312 to analyze vehicle VIN 204, instructions for which may be stored within initial setup data 302, to determine the make and model of vehicle 106. Method 600 then proceeds to step 604.

In step 604, method 600 identifies and selects assessment readings, including standard assessment readings and heightened assessment readings, to be performed by the vehicle assessment analyzer. In one example of step 604, analytics server processor 116 executes assessment reading selector 312 to select, an assessment reading from assessment reading database 316 based upon the make and model identified in step 602. Method 600 then proceeds to step 606.

In step 606, method 600 generates callouts for performing the selected assessment readings. In one example of step 606, analytics server processor 116 executes assessment reading callout generator 314 to create standard assessment list 308 and heightened assessment list 310 based upon the assessment readings selected by assessment reading selector 312, and in conformance with vehicle callout requirements 318. Method 600 then proceeds to step 608, if included, or directly to step 610.

In step 608, method 600 assigns conditions for performing various assessment readings. In one example of step 608, analytics server processor 116 executes assessment condition selector 322 to identify assessment conditions 320 based on the make and model identified in step 602, and in conformance with conditions database 324. An example of an assessment condition 320 may include requiring vehicle assessment analyzer 102 to switch baud speed, or between two CAN busses to get data from each in multi-bus or multi-plexed vehicles. Another example may be requiring the vehicle 106 to be at a particular temperature or oil pressure prior to executing an assessment reading on assessment list 306. Method 600 then proceeds to step 610.

In step 610, method 600 stores the generated assessment instructions within the vehicle assessment analytics server for spatial analysis and machine learning of community vehicle data. In one example of step 610, assessment instructions 306 are stored within analytics server memory 118 including standard assessment list 308 (generated during step 606), heightened assessment list 310 (generated during step 606), and assessment conditions 320 (generated during step 608, if included) and utilized for spatial analysis and machine learning of community vehicle data 122.

Figure 7:
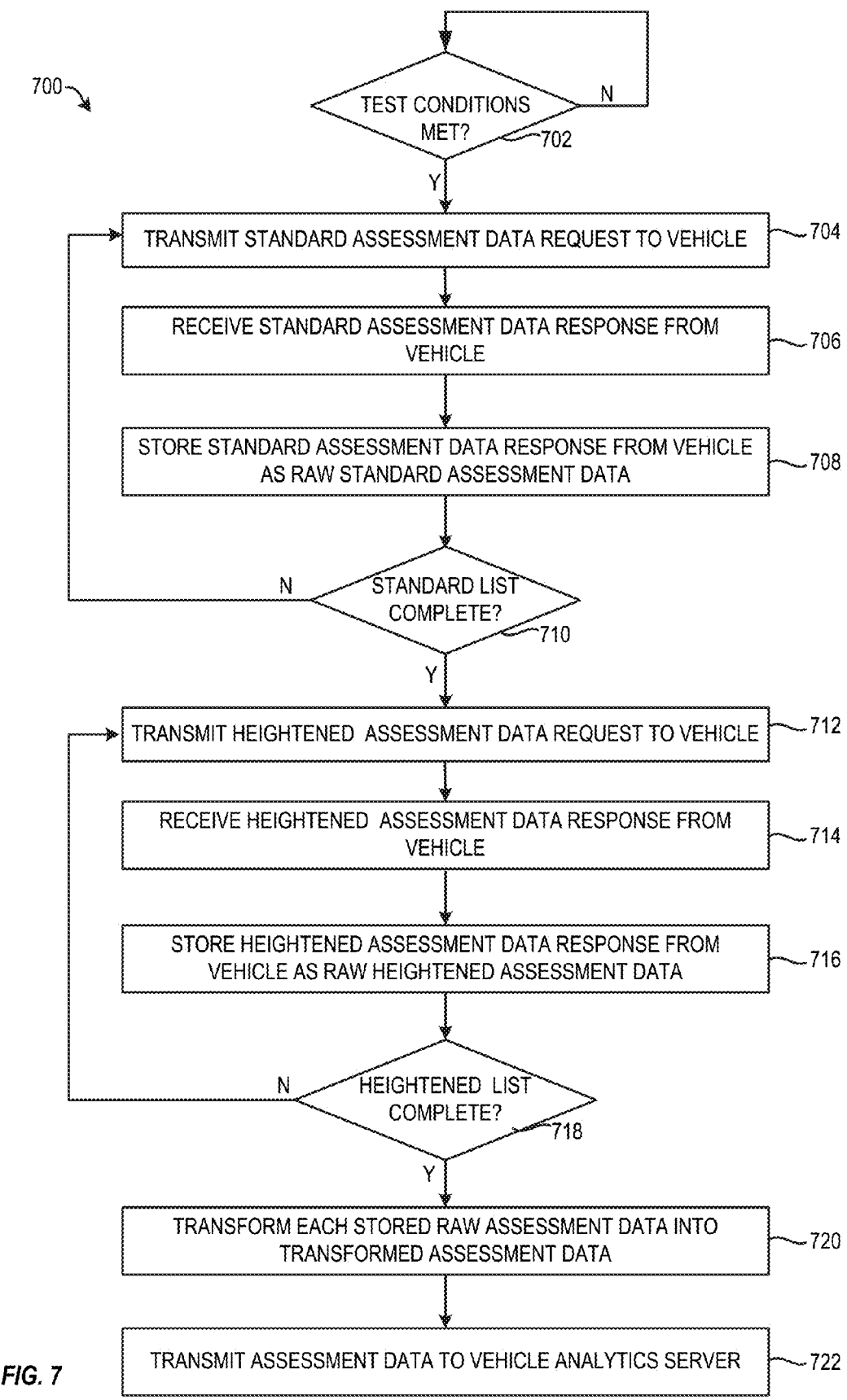
FIG. 7 depicts an exemplary method for performing assessment readings on a vehicle, in embodiments.

FIG. 7 depicts an exemplary method 700 for performing assessment readings on a vehicle, in embodiments. Method 700 provides additional details of embodiments of step 516 of method 500 of FIG. 5, discussed above. Method 700 is for example implemented within assessment data grabber 208 of vehicle assessment analyzer 102.

In embodiments including decision 702, method 700 determines if all assessment readings conditions required for performing assessment of the vehicle are met. If they are met, method proceeds to step 704, if they are not met, method 700 waits until all conditions are met. In one example of decision 702, vehicle assessment analyzer 102, via processor 110, executes assessment data grabber 208 to determine if all assessment conditions 320 are met by vehicle 106. For example, assessment data grabber 208 may determine if the vehicle engine temperature is above a given threshold before proceeding to step 704.

In step 704, method 700 transmits a standard assessment data request to the vehicle. In one example of step 704, processor 110 executes assessment data grabber 208 to transmit an assessment data request 134 to the vehicle computer based upon a standard assessment reading identified in standard assessment list 308. Method 700 then proceeds to step 706.

In step 706, method 700 receives a standard assessment data response from the vehicle. In one example of step 706, vehicle assessment analyzer 102, via vehicle interface 108, receives an assessment data response 136 from the vehicle computer. Method 700 then proceeds to step 708.

In step 708, method 700 stores the received standard assessment data response as raw standard assessment data. In one example of step 708, processor 110 executes assessment data grabber 208 to store the received standard assessment data from step 706 as raw standard assessment data 212.

In step 710, method 700 determines if all standard assessment readings required by the assessment instructions have been completed. If all have been completed, method 700 proceeds to step 712, else method repeats steps 704, 706, and 708 to respectively generate an additional assessment data request, receive an additional assessment data response, and store an additional raw standard data point until all have been completed. In one example of step 710, assessment data grabber 208 determines if all of the standard assessment readings within standard assessment list 308 have been completed.

In step 712, method 700 transmits an heightened assessment data request to the vehicle. In one example of step 704, processor 110 executes assessment data grabber 208 to transmit an additional assessment data request 134 to the vehicle computer based upon a heightened assessment reading identified in heightened assessment list 310. Method 700 then proceeds to step 714.

In step 714, method 700 receives a heightened assessment data response from the vehicle. In one example of step 714, vehicle assessment analyzer 102, via vehicle interface 108, receives an additional assessment data response 136 from the vehicle computer based on the heightened assessment request transmitted during step 712. Method 700 then proceeds to step 716.

In step 716, method 700 stores the received heightened assessment data response as raw standard assessment data. In one example of step 716, processor 110 executes assessment data grabber 208 to store the received heightened assessment data from step 714 as raw heightened assessment data 214.

In step 718, method 700 determines if all heightened assessment readings required by the assessment instructions have been completed. If all have been completed, method 700 proceeds to step 720, if included, or method 700 repeats steps 712, 714, and 716 until all assessment readings have been completed or a maximum number of attempts has been exceeded at which time the remaining collected assessment data will be sent, via communication interface 114 to the vehicle assessment analytics server 104. In one example of step 718, assessment data grabber 208 determines if all of the heightened assessment readings within heightened assessment list 310 have been completed or when to send partially completed assessment readings.

In step 720, method 700 transforms each raw assessment data into transformed assessment data. In one example of step 720, data transformer 209 executes a transform on one or both of raw standard assessment data 212 and raw heightened assessment data 214 to generate transformed standard assessment data 216 and transformed heightened assessment data 218, respectively. For example, data transformer 209 may average each type of assessment reading performed, or perform another transform on the data as discussed above.

Method 700 then in step 722, transmits the assessment data (either raw, transformed, or both) to the vehicle assessment analytics server. For example, vehicle assessment analyzer 102 may transmit, via communication interface 114, one or more of raw standard assessment data 212, raw heightened assessment data 214, transformed standard assessment data 216, and transformed heightened assessment data 218 to vehicle assessment analytics server 104.

Figure 8:
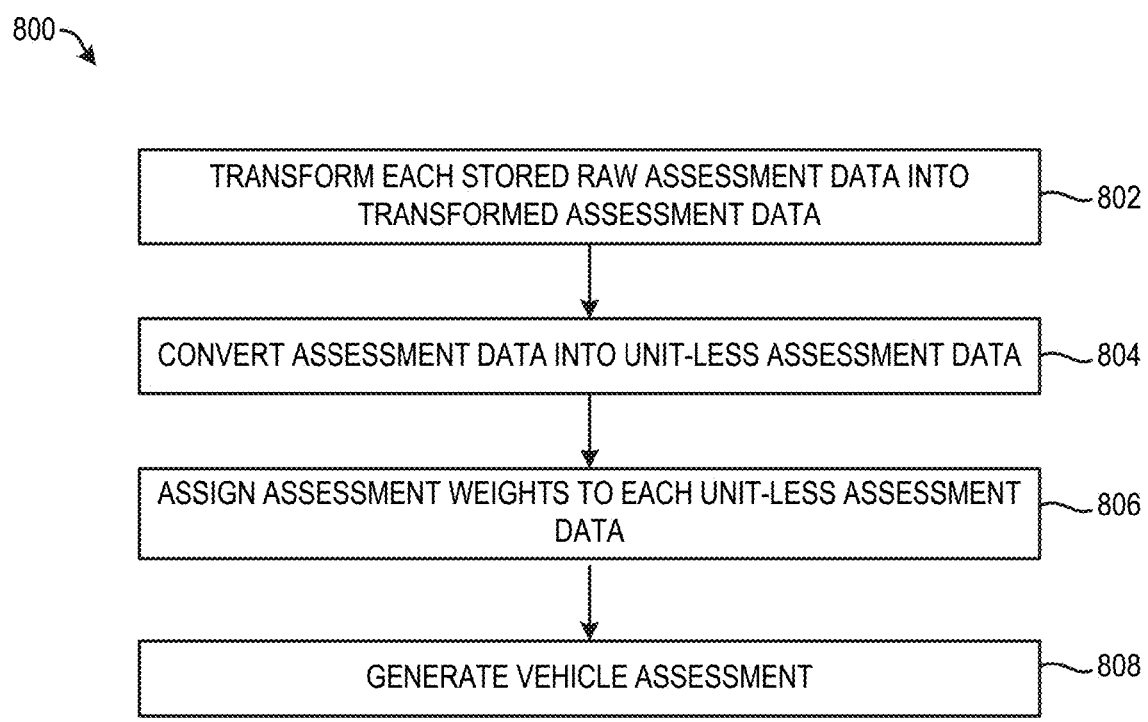
FIG. 8 depicts an exemplary method for generating a vehicle assessment based on captured assessment data, in embodiments.

FIG. 8 depicts an exemplary method 800 for generating a vehicle assessment based on captured assessment data, in embodiments. Method 800 provides additional details of embodiments of step 520 of method 500 of FIG. 5, discussed above. Method 800 is for example performed via assessment generator 326 of vehicle assessment analytics server 104.

In step 802, if included in certain embodiments, method 800 transforms each stored raw assessment data into transformed assessment data. Step 802 is similar to step 720, but performed via vehicle assessment analytics server 104 instead of vehicle assessment analyzer 102. Method 800 then proceeds with step 804.

In step 804, method 800 converts assessment data into unit-less assessment data. In one example of operation of step 804, analytics server processor 116 executes assessment generator 326 to create unit-less assessment data 328 by comparing one or more of raw standard assessment data 212, raw heightened assessment data 214, transformed standard assessment data 216, and transformed heightened assessment data 218 against community vehicle data 122. Method 800 then proceeds with step 806.

In step 806, method 800 assigns assessment weights to each unit-less assessment data. In one example of step 806, analytics server processor 116 executes assessment generator 326 to assign an applicable assessment weight 330 to each unit-less assessment data 328. Method 800 then proceeds with step 808.

In step 808, method 800 generates completed vehicle assessment based on the weighted, unit-less assessment data of steps 802, 804, and 806. In one example of step 808, analytics server processor 116 executes assessment generator 326 to generate vehicle assessment 120 by adding the unit-less assessment data 328 that is weighted according to assessment weights 330 from step 806.

Figure 9:
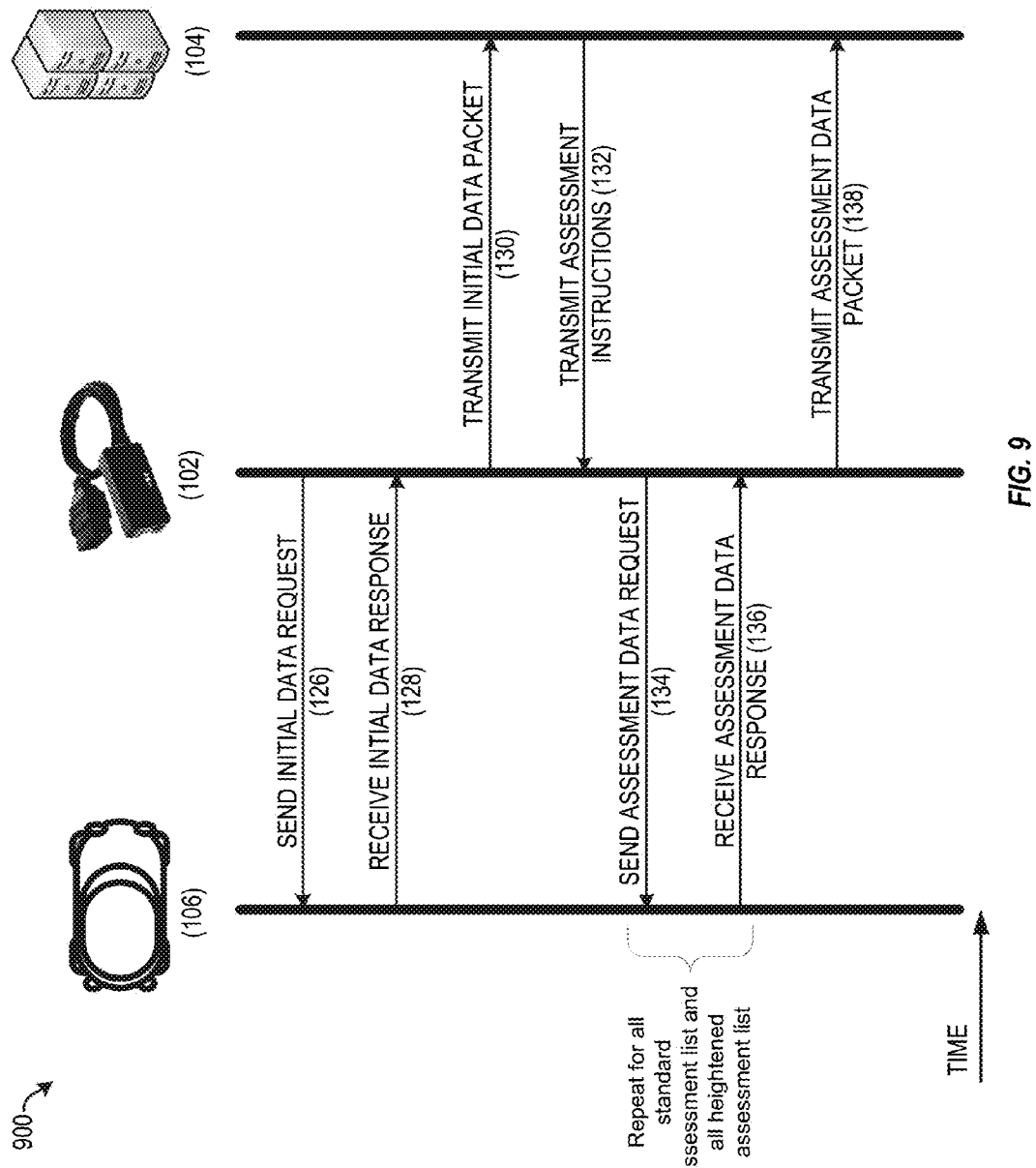
FIG. 9 depicts an exemplary timing flow chart showing exemplary communication between each of vehicle, vehicle assessment analyzer, and vehicle assessment analytics server, of FIG. 1, in embodiments.

FIG. 9 depicts an exemplary timing flow chart 900 showing exemplary communication between each of vehicle 106, vehicle assessment analyzer 102, and vehicle assessment analytics server 104, in embodiments.

As shown in FIG. 9, the communication may begin with vehicle assessment analyzer 102 sending an initial data request 126 to vehicle 106. In response, vehicle assessment analyzer 102 receives from vehicle 106 the initial data including vehicle VIN 204 (and additional initial data 206, if included). Initially, vehicle assessment analyzer 102 may perform initialization protocol 201 to perform a handshake between vehicle assessment analyzer 102 and one or both of vehicle ECM (and/or communication bus) of vehicle 106 and vehicle assessment analytics server 104 to verify connection there between.

After receipt of vehicle VIN 204 (and additional initial data 206, if included), vehicle assessment analyzer 102 transmits the initial data packet 130, including said VIN and initial data (if included) to vehicle assessment analytics server 104 via communications interface 114. Analytics server processor 116 then executes assessment list generator 304 to generate assessment instructions 306 as discussed above. These assessment instructions are then transmitted (132) via the communications interface 114 to the vehicle assessment analyzer 102.

Vehicle assessment analyzer 102 then sends at least one assessment data request 134 and receives at least one assessment data response 136 to and from vehicle 106, respectively. This assessment data request/response send and receipt repeats until assessment readings within standard assessment list 308 and heightened assessment list 310 are completed. Assessment data request messages may either be sent to the vehicle assessment analyzer 102 in single individual request, multiple requests, or all in one file.

Upon completion of assessment instructions 306, vehicle assessment analyzer 102 may transform the received raw assessment data into transformed assessment data (e.g. transformed standard assessment data 216, and transformed heightened assessment data 218). One or both of the raw or transformed assessment data is then transmitted from vehicle assessment analyzer 102 to vehicle assessment analytics server 104, via communications interface 114, as assessment data packet 138. Analytics server processor 116 may then execute assessment generator 326 to generate vehicle assessment 120 as discussed above.

Figure 10:
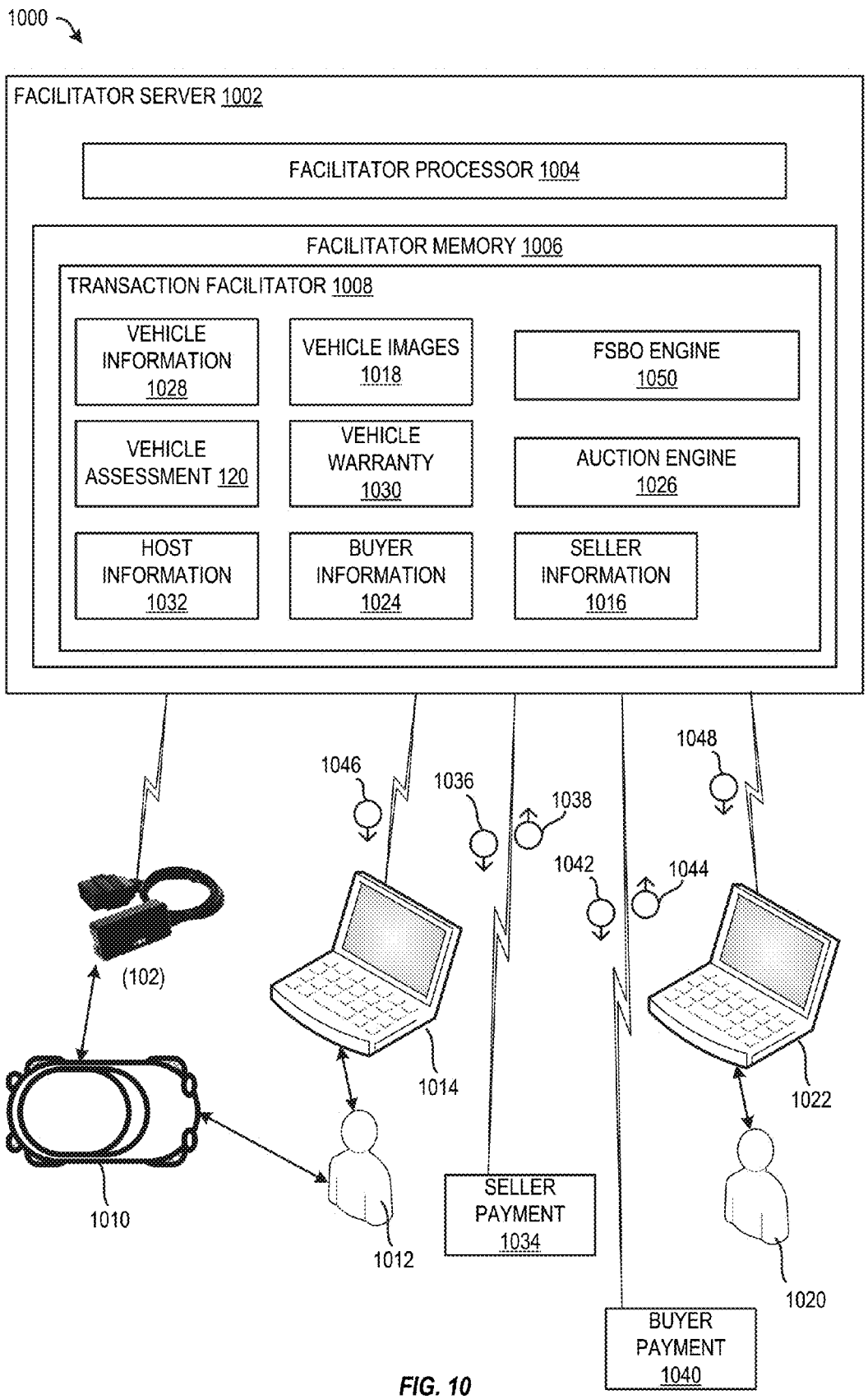
FIG. 10 depicts an exemplary vehicle transaction facilitation system for facilitating a transaction between a buyer and seller of a vehicle, in embodiments.

FIG. 10 depicts an exemplary vehicle transaction facilitation system 1000 for facilitating a transaction between a buyer and seller of a vehicle, in embodiments. Facilitation system 1000 may be implemented on a facilitator server 1002. Facilitator server 1002 may be in the form of a computer, or bank of computers communicatively coupled together, accessible via the Internet. In embodiments, facilitator server 1002 is the same server as vehicle assessment analytics server 104, discussed above with reference to FIGS. 1-9, or it may be supplied by a third party.

Facilitator server 1002 includes a facilitator processor 1004 coupled with facilitator memory 1006. Facilitator processor 1004 may be the same as or different from analytics server processor 116. Facilitator memory 1006 may be the same as or different from analytics server memory 118. Facilitator memory 1006 stores, or otherwise links via a network connection to, a transaction facilitator 1008 comprising computer readable instructions, stored on a transitory and/or non-transitory computer readable medium, that, when executed by facilitator processor 1004 facilitate a transaction between a buyer and a seller of a vehicle 1010. Vehicle 1010 is similar to vehicle 106 discussed above.

In embodiments, facilitator server 1002 receives vehicle assessment 120 from vehicle assessment analyzer 102 which is in communication with vehicle 1010. Vehicle assessment analyzer 102 functions as discussed above with respect to FIGS. 1-9 to generate vehicle assessment 120. In other embodiments, facilitator server 1002 may operate as an independent third party service using an application protocol interface (API) to connect to vehicle assessment analytics server 104, such as third party service 124, shown in FIG. 1.

A seller 1012 desiring to sell vehicle 1010 interacts with seller device 1014 to transmit information to facilitator server 1002. Seller device 1014 may be one or more of a computer, PC, laptop, mobile phone, smartphone or any other device capable of connecting with facilitator server 1002 via a network connection such as the internet. Seller 1012 interacts with seller device 1014 to provide seller information 1016. Seller information 1016 may include seller identification information including contact information, as well as financial information such as credit card, bank, Paypal, account, or other financial information associated with a seller payment 1034. Seller information 1016 may be automatically uploaded by vehicle assessment analyzer 102 such that seller 1012 is "enrolled" with facilitator server 1002 upon generation of vehicle assessment 120. Seller 1012 also interacts with seller device 1014 to upload one or more vehicle images 1018 of vehicle 1010. Accordingly, vehicle 1010 may be shipped to a third party location for auction sale, it may be shipped to the same location as facilitator server 1002, or instead it may remain in possession of seller 1012 until completion of a system enabled transaction between seller 1012 and a buyer 1020. Seller information 1016 may further include dealership information if seller 1012 is a licensed dealer.

Buyer 1020 may desire to purchase vehicle 1010 and interacts with buyer device 1022 to transmit information to facilitator server 1002. Buyer device 1022 may be one or more of a computer, PC, laptop, mobile phone, smartphone, smartphone or computer application, or any other device capable of connecting with facilitator server 1002 via a network connection such as the internet. Prior to the auction, buyer 1020 interacts with buyer device 1022 to provide buyer information 1024. Buyer information 1024 may include buyer identification information including contact information, as well as financial information such as credit card, bank, Paypal or other financial payment information. Buyer information 1024 may further include dealership information if buyer 1020 is a licensed dealer. Accordingly, buyer 1020 and seller 1012 need never meet or be identified to each other prior to a transaction facilitated via transaction facilitation server 1002.

It should be appreciated that there may be multiple sellers 1012 each selling one or more vehicles 1010 without departing from the scope hereof. Similarly, there may be more buyers 1020 each attempting to buy vehicle 1010, or other vehicles being sold via facilitator server 1002 without departing from the scope hereof.

In embodiments, facilitator memory 1006 stores an auction engine 1026. Auction engine 1026 may comprise transitory and/or non-transitory computer readable instructions that, when executed by facilitator processor 1004, facilitates identification of a specific buyer 1020 who is to purchase vehicle 1010 from seller 1012. In embodiments, auction engine 1026 does not facilitate the transfer of remittance from buyer 1020 to seller 1012, but instead merely identifies the two parties, the sale amount of vehicle 1010, and facilitates the connection between the buyer 1020 and seller 1012 after the sale occurs which in turn complete the financial transaction involving the item sold between themselves.

Auction engine 1026 may operate by promoting vehicle 1010 based upon its vehicle information 1028, vehicle assessment 120 of that vehicle 1010, and vehicle images 1018. Vehicle information 1028 may include the vehicle VIN (i.e. vehicle VIN 204) as well as other identification information such as make, model, year, manufacturer, and mileage. Vehicle information 1028 may be automatically obtained via vehicle assessment analyzer 102 to insure veracity of the information therein.

Auction engine 1026 may further promote vehicle 1010 by automatically allocating a vehicle warranty 1030, such as a 14 day guarantee on vehicle 1010. Vehicle warranty 1030 may be automatically generated based upon conditions surrounding vehicle assessment 120. For example, if vehicle assessment 120 is above a first threshold, the vehicle warranty 1030 may be automatically generated having a two-year/20,000 mile expiration period. If the vehicle assessment 120 is above a second threshold, but below the first threshold, the vehicle warranty 1030 may be automatically generated having a one-year/5,000 mile expiration period. Lastly, if the vehicle assessment 120 is above a third threshold, but below the first and second thresholds, the vehicle warranty 1030 may automatically generated having only a 30 day expiration period. The time and/or mileage of the warranty 1030 is not limited to the above example but may be for any timespan and any mileage. Vehicle warranty 1030 may be provided by an auction host. The host information 1032 identifies the information of the auction host, and may include host contact information. In embodiments, the auction host need not have a dealer license because auction engine 1026 is not facilitating the specific purchase/sale of vehicle 1010, but instead merely identifying the transaction parties to the purchase/sale of vehicle 1010.

Auction engine 1026, when executed by facilitator processor 1004, may operate to perform an auction, on behalf of seller 1012, to sell vehicle 1010. Auction engine 1026 may identify buyer 1020 based upon a winning bid presented by buyer 1020 via buyer device 1022 and seller 1012 may in turn (or simultaneously) accept such winning bid via his seller device 1014. Auction engine 1026 may access seller information 1016 to identify and process a seller payment 1034 upon bid acceptance. Seller payment 1034 may be a credit card, bank, PayPal® or other financial payment system. Upon start of auction by auction generator 1026, or during setup of an auction to sell vehicle 1010, auction engine 1026 may transmit a seller payment request 1036 to seller payment 1034, which in return transmits a seller auction fee 1038 to the host identified within host information 1032. Auction engine 1026 may also access buyer information 1024 to identify and process buyer payment 1040 simultaneously with seller 1012 acceptance of buyer's 1020 winning bid. Buyer payment 1040 may be a credit card, bank, PayPal or other financial payment system. Upon completion of the actual on-line live auction vehicle sale, auction engine 1026 may transmit a buyer payment request 1042 to buyer payment 1040, which in return transmits a buyer auction fee 1044 to the host identified within host information 1032. Seller auction fee 1038 and buyer auction fee 1044 may not be the payment for the vehicle, but instead is a fee associated for participation within the auction performed by auction engine 1026 to facilitate connection and the final financial transaction of the vehicle sale between a buyer 1020 and seller 1012 of vehicle 1010 directly.

Further upon completion of the auction, auction engine 1026 may transmit auction information 1046 including contact information of the buyer 1020, defined within buyer information 1024, as well as the auction details such as vehicle purchase price, etc., to the seller 1012. Auction information 1046 may be transmitted to seller device 1014 via text, e-mail or other electronic messaging protocol. Furthermore, auction engine 1026 may transmit auction information 1048 including contact information of the seller 1012, defined within seller information 1016, as well as the auction details such as vehicle purchase price, etc., to the buyer 1020. Auction information 1048 may be transmitted to buyer device 1022 via text, e-mail or other electronic messaging protocol.

Figure 11:
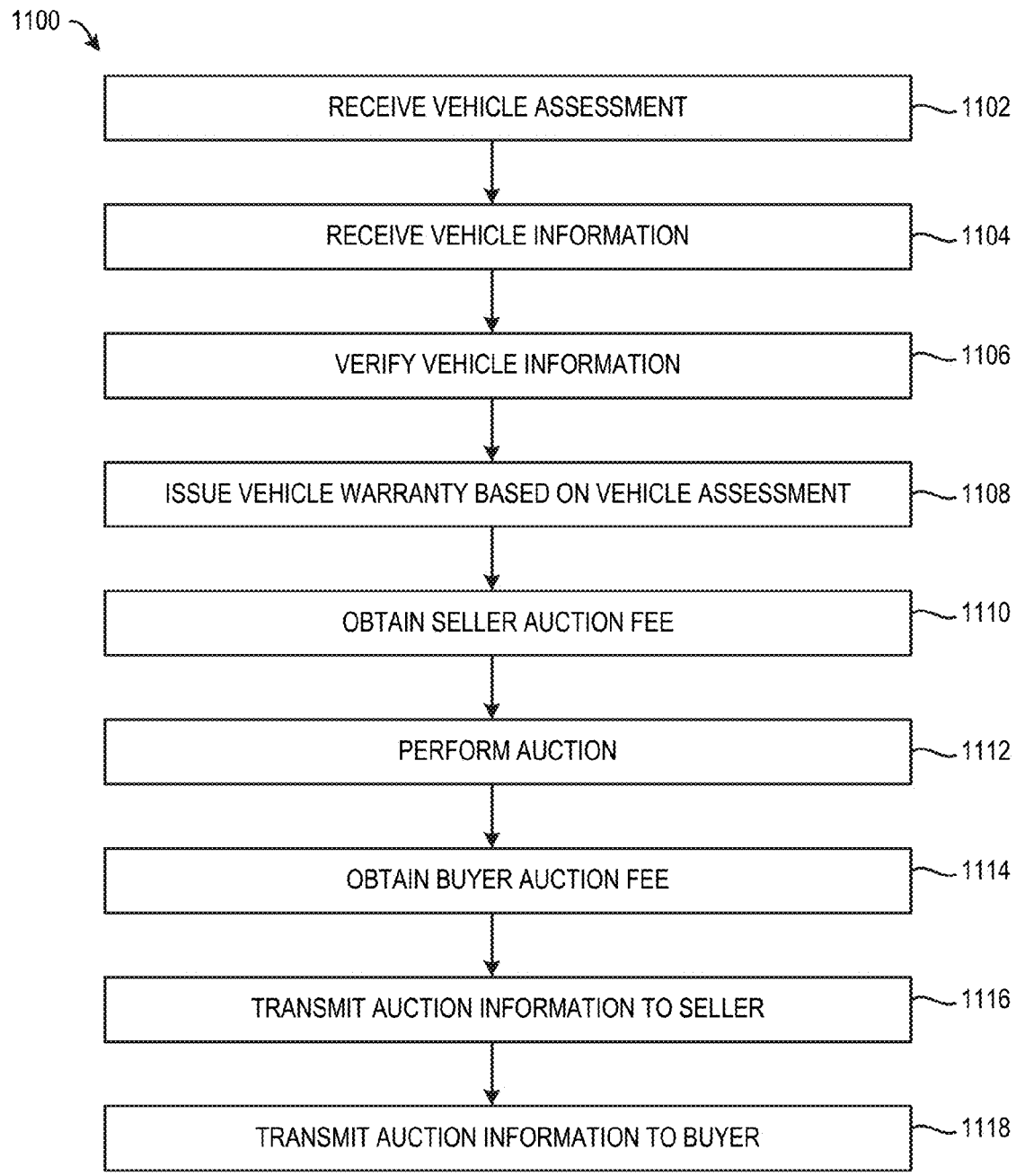
FIG. 11 depicts an exemplary method for vehicle transaction facilitation, in embodiments.

FIG. 11 depicts an exemplary method 1100 for vehicle transaction facilitation, in embodiments. Method 1100 is for example performed within vehicle transaction facilitation system 1000 discussed above with reference to FIG. 10.

In step 1102, method 1100 receives a vehicle assessment for a vehicle participating in a vehicle transaction between a buyer and seller. In one example of operation of step 1102, facilitator server 1002 receives vehicle assessment 120 based upon vehicle 1010 that is being sold by seller 1012 and purchased by buyer 1020. Step 1102 may include any of the steps discussed above with regards to FIGS. 5-9, and may be performed using the vehicle assessment system 100 discussed above with regards to FIGS. 1-4.

In step 1104, method 1100 receives vehicle information about the vehicle participating in a vehicle transaction between a buyer and seller. In one example of operation of step 1104, facilitator server 1002 automatically receives valid vehicle information 1028 from vehicle assessment analyzer 102. In another example of operation of step 1104, which may occur additionally to, or individually from, the above example, seller 1012 interacts with seller device 1014 to transmit vehicle information 1028 to facilitator server 1002. In another example of operation of step 1104, which may occur additionally to, or individually from, the above examples, seller 1012 interacts with seller device 1014 to transmit vehicle images 1018 to facilitator server 1002.

In embodiments including step 1106, method 1100 verifies the vehicle information from step 1104. In one example of step 1106, facilitator server 1002 interacts with vehicle assessment analyzer 102 either directly or through the vehicle assessment analytics server 104 to obtain vehicle information, and verify the veracity of the vehicle information 1028 manually input by seller 1012 via seller device 1014.

In step 1108, method 1100 issues a vehicle warranty based on the vehicle assessment of step 1102. In one example of step 1108, auction engine 1026 issues vehicle warranty 1030 based upon vehicle assessment 120. In another example of step 1108, a third party interacts with facilitator server 1002 to issue vehicle warranty 1030 based on vehicle assessment 120.

In step 1110, method 1100 obtains a seller auction fee for participating within an auction to sell the vehicle. In one example of step 1110, auction engine 1026 accesses seller information 1016 to identify a seller payment 1034. Auction engine then, upon start of auction, or during setup of an auction to sell vehicle 1010, transmits a seller payment request 1036 to seller payment 1034, which in return transmits a seller auction fee 1038 to the host identified within host information 1032.

In step 1112, method 1100 performs an auction to facilitate the transaction between a buyer and seller for sale of the vehicle. In one example of step 1112, auction engine 1026 performs an auction to identify the seller 1012, vehicle 1010, buyer 1020, and purchase/sale price of vehicle 1010. Seller 1012 may electronically accept a winning bid online, such as via sending an "accept bid" notification from seller device 1014 to facilitator server 1002. If seller 1012 is not available, auction engine 1026 may indicate to the buyer 1020 and inform seller 1012 with a conditional "if" such that the winning bid will not be accepted until and if the seller 1012 decides to accept the winning bid. Acceptance may be required within a given time period, such as by 3 PM the day of close of the auction performed by auction generator 1026 or some penalty may apply. Alternatively in some embodiments, seller 1012, via seller device 1014, may indicate a counter offer to buyer 1020 or decline the bid before time expires. In such embodiments, method 1100 may perform step 1110 and optionally perform steps 1112, 1114, 1115, and 1118.

In step 1114, method 1100 may obtain a buyer auction fee for participating and/or winning a bid within an auction to buy a vehicle. In one example of step 1114, auction engine 1026 accesses buyer information 1024 to identify a buyer payment 1040. Auction engine then transmits a buyer payment request 1042 to buyer payment 1040, which in return transmits a buyer auction fee 1044 to the host identified within host information 1032 which may then allow buyer to bid in the auction. Buyer auction fee 1044 may not be the purchase price of vehicle 1010.

In step 1116, method 1100 transmits the auction information to the seller. In one example of operation of step 1116, once the sale had occurred and been accepted by buyer and seller and above payment transactions in steps 1112 and 1114 are completed, auction engine 1026 transmits auction information 1046 including contact information of the winning bid buyer 1020, defined within buyer information 1024, as well as the auction details identified during step 1112 such as vehicle purchase price, etc., to the seller 1012.

In step 1118, method 1100 transmits the auction information to the buyer. In one example of operation of step 1118, auction engine 1026 transmits auction information 1048 including contact information of the seller 1012, defined within seller information 1016, as well as the auction details identified during step 1112 such as vehicle purchase price, etc., to the buyer 1020.

Upon completion of method 1100, buyer 1020 and seller 1012 may complete the transaction and transfer of vehicle 1010 without participation by facilitator server 1002. The steps within method 1100 may be performed in any other order than shown. For example, step 1110 may be performed prior to step 1102, or other steps, etc.

The above described systems and methods provide significant advantages for vehicle analytics and transaction facilitation. On average, 42 million used vehicles change hands each year in the US and very few of them go through a pre-purchase inspection process detailing the current mechanical or electronic condition prior to sale. Instead, only visual or "point" inspections occur. The above described vehicle assessment 120, and how it is obtained as discussed above with respect to FIGS. 1-9, provides a simple to use, universal wireless vehicle assessment analyzer 102 connected to a cloud based data processing server 104 which automatically monitors and assesses the real-time condition of the vehicle and compares it to an extensive community vehicle database of known mechanical and electronic component parameters and failure modes, resulting in a comprehensive report of the cars current condition. This report (e.g. the vehicle assessment 120) is trustworthy because it is based on objective data and not subjective opinion by a human "point" inspector.

Annually, 20 million used vehicles pass through vehicle auctions, and almost 16 million are sold by independent dealers and about 19 million end up as "for sale by owner" (FSBO) in the private market. In each of these sales models, the buyer has no knowledge of hidden details within the vehicle, such as mechanical or electronic failures. The above described vehicle assessment 120, and the facilitation system 1000 discussed above with respect to FIGS. 10-11 cure this unknown void for the buyer. By having knowledge of the objective (and not subjective) vehicle assessment, the buyer can trust that the vehicle she or he is purchasing is legitimate. Moreover, the objective analysis enables sellers or third party vendors to have faith in giving warranties on the vehicle's performance and lifespan based on such vehicle assessment.

Referring back to FIG. 10, facilitator server 1002 need not facilitate an auction of vehicle 1010, but instead may facilitate a for-sale-by-owner (FSBO), or straight sale of the vehicle 1010 (i.e. not through an auction, but via a private owner or dealer direct to a buyer without the bidding process). In such embodiments, facilitator 1002 may or may not include auction engine 1026, but includes FSBO engine 1050. FSBO engine 1050 provides a portal, accessible by seller 1012, via seller device 1014, and buyer 1020, via buyer device 1022. The portal generated by FSBO engine 1050 may list vehicle 1010 as available for sale including vehicle information 1028, vehicle images 1018, vehicle assessment 120 and vehicle warranty 1030.

As an example, to sell vehicle 1010 using FSBO engine 1050, seller 1012 may use vehicle assessment analyzer 102 to generate a vehicle assessment 120. This may be done by seller 1012 plugging vehicle assessment analyzer 102 at his/her location, or by a third party vendor such as an auto shop (e.g. PepBoys, Goodyear, Autozone, Sears Auto, Midas, etc.). Upon generation of vehicle assessment 120, the assessment is uploaded to facilitator server 1002.

FSBO engine 1050 then creates the above discussed portal including where buyer(s) 1020 are shown vehicle information 1028, vehicle images 1018, vehicle assessment 120, and vehicle warranty 1030 on buyer device 1022. Buyer 1020, via buyer device 1022, may then submit offers for purchasing vehicle 1010 to which seller 1012, via seller device 1014, may counter, deny, or accept.

Prior to FSBO engine 1050 creating the portal, and/or prior to seller 1012 countering, denying or accepting an offer, FSBO engine 1050 may access seller information 1016 to identify a seller payment 1034. FSBO engine 1050 then transmits a seller payment request 1036 to seller payment 1034, which in return transmits a seller fee 1038 to the host identified within host information 1032.

Prior to buyer 1020 being able to see the vehicle information, images, assessment or vehicle warranty, and/or upon a buyer 1020 providing an offer to purchase vehicle 1010, FSBO engine 1050 may access buyer information 1024 to identify a buyer payment 1040. FSBO engine 1050 then transmits a buyer payment request 1042 to buyer payment 1040, which in return transmits a buyer fee 1044 to the host identified within host information 1032.

Figure 12:
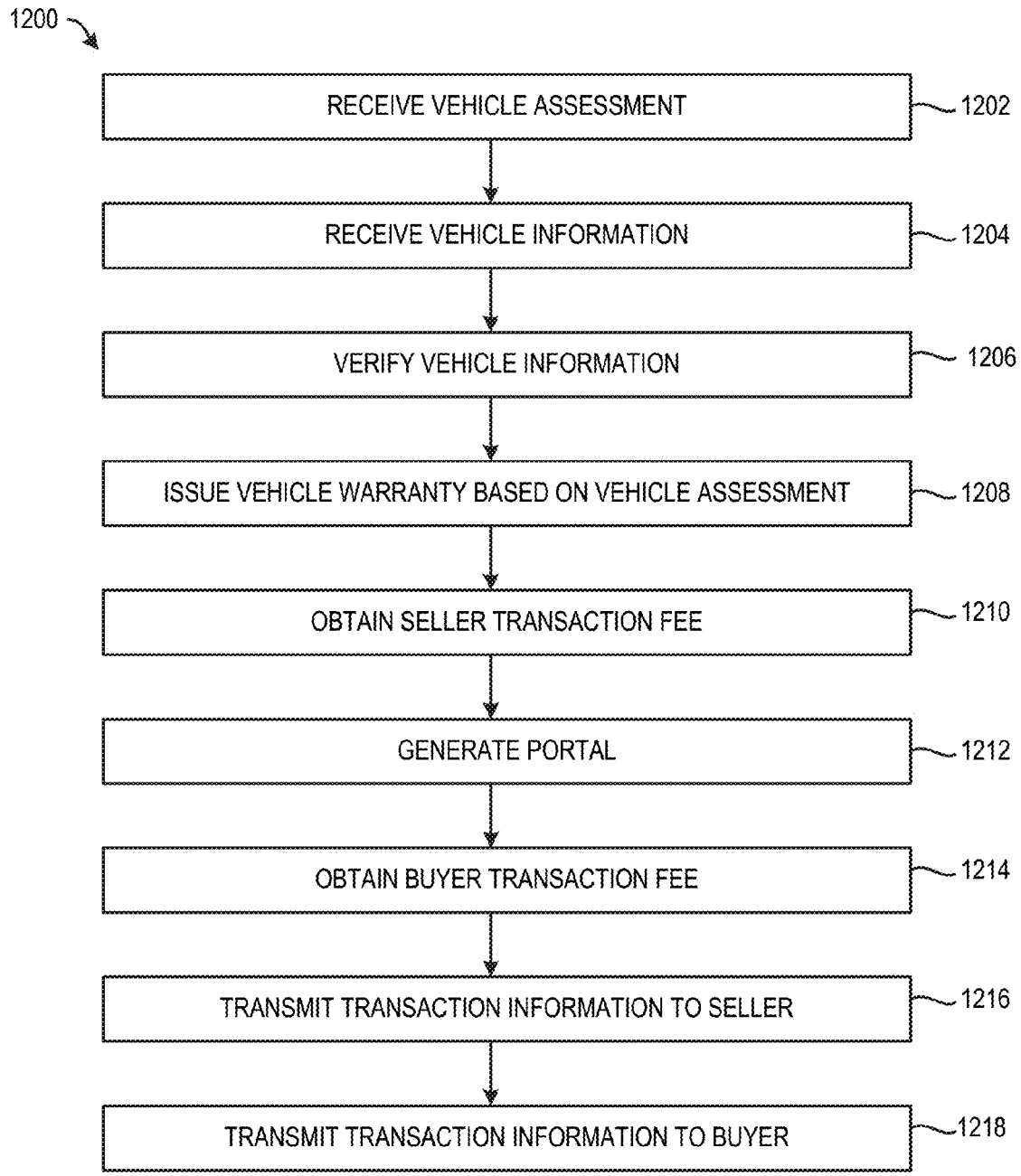
FIG. 12 depicts an exemplary method for vehicle transaction facilitation, in additional embodiments.

FIG. 12 depicts an exemplary method 1200 for vehicle transaction facilitation, in additional embodiments. Method 1200 is for example performed within vehicle transaction facilitation system 1000 discussed above with reference to FIG. 10.

Steps 1202, 1204, 1206, and 1208 are the same as steps 1102, 1104, 1106, and 1108, respectively, as discussed above with respect to FIG. 11, but may be performed by FSBO engine 1050 instead of auction engine 1026.

In step 1210, which is similar to step 1110, method 1200 obtains a seller transaction fee for participating within sale the vehicle which may or may not enter seller in an auction or online market place. In one example of step 1210, FSBO engine 1050 accesses seller information 1016 to identify a seller payment 1034. FSBO engine 1050 then, upon creation of a portal displaying information such as vehicle information 1028, vehicle images 1018, vehicle assessment 120 and/or vehicle warranty 1030, or after seller 1012 denies, counters, or accepts an offer from buyer 1020, transmits a seller payment request 1036 to seller payment 1034, which in return transmits a seller fee 1038 to the host identified within host information 1032.

In step 1212, FSBO engine 1050 generates a portal displaying information about the vehicle being sold. In one example of operation of step 1212, FSBO engine 1050 generates a portal, visible to buyer 1020 and seller 1012 via buyer device 1022 and seller device 1014, respectively, that displays one or more of vehicle information 1028, vehicle images 1018, vehicle assessment 120 and/or vehicle warranty 1030.

In step 1214, method 1200 obtains a buyer transaction fee for participating within the transaction to buy a vehicle. In one example of step 1214, FSBO engine 1050 accesses buyer information 1024 to identify a buyer payment 1040. FSBO engine 1050 then transmits a buyer payment request 1042 to buyer payment 1040, which in return transmits a buyer transaction fee 1044 to the host identified within host information 1032. Buyer transaction fee 1044 may not be the purchase price of vehicle 1010.

In step 1216, method 1200 transmits the auction information to the seller. In one example of operation of step 1216, once the sale had occurred and been accepted by buyer and seller and above payment transactions in steps 1212 and 1214 are completed, FSBO engine 1050 transmits the transaction information including auction information or sales price of vehicle 1010 and contact information of the buyer 1020, defined within buyer information 1024, as well as the sale or auction details identified during step 1212 such as vehicle purchase price, etc., to the seller 1012.

In step 1218, method 1200 transmits the transaction information to the buyer. In one example of operation of step 1218, FSBO engine 1050 transmits transaction information including contact information of the seller 1012, defined within seller information 1016, as well as the transaction details identified during step 1212 such as vehicle purchase price, etc., to the buyer 1020.

Upon completion of method 1200, buyer 1020 and seller 1012 may complete the transaction and transfer of vehicle 1010 without participation by facilitator server 1002. The steps within method 1200 may be performed in any other order than shown. For example, step 1210 may be performed prior to step 1202, or other steps, etc.

The system and method discussed above with respect to FIGS. 10-12 provides significant cost savings to the buyer, seller, and the host of an auction. The discussed system and method eliminates the need for physical transport of the vehicle 1010 to the auction warehouse, or other dealer, thereby eliminating real estate required for the auction or sale of the vehicle, as well as transportation costs from the seller to the auctioneer or dealer. Further yet, cost savings are provided to the buyer because the buyer need only pay for transportation once, e.g. from the seller to buyer, instead of paying a premium to the auctioneer or other third party dealer serving as a middle man. The auction host (auctioneer or sales broker) now does not require a dealership license as the virtual auction space provided by auction engine 1026 may facilitate only identification of the buyer 1020, seller 1012, and sales price of vehicle 1010. As such, the host is not participating in the actual transaction, but instead providing as a match maker for buyers and sellers. Further yet, buyers will be more confident buying from such host, or from a FSBO seller because, either directly or through a third party vendor, a warranty of the vehicle is automatically generated based on the confidence and veracity of the vehicle assessment.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A vehicle assessment analyzer, comprising:
   a vehicle interface adapted to couple with at least one of a vehicle network computer and-a vehicle communication bus;
   a communication interface adapted to communicate with a vehicle assessment analytics server;
   a processor in communication with memory, the memory storing computer readable instructions that when executed by the processor cause the vehicle assessment analyzer to:
   transmit an initial data request, for a vehicle identification number (VIN), to the vehicle network computer,
   transmit an initial data packet, including the VIN, to the vehicle assessment analytics server,
   receive an assessment list from the vehicle assessment analytics server, the assessment list identifying one or more native assessment readings to be performed on the vehicle by the vehicle assessment analyzer, the native assessment readings defining at least one communication to be captured by the vehicle assessment analyzer from at least one individual sensor directly via the vehicle communication bus; and
   transmit an assessment data packet to the vehicle assessment analytics server, the assessment data packet including data obtained from the vehicle based on the native assessment readings.

2. The vehicle assessment analyzer of claim 1, the initial data request including a request to obtain additional initial data including one or more of: an odometer reading, an RPM reading, and an engine temperature reading, the initial data packet including the additional initial data.

3. The vehicle assessment analyzer of claim 1, the memory further storing a predefined standard assessment list identifying standard assessment readings that control the vehicle assessment analyzer to query the vehicle network computer according to standard OBD callouts.

4. The vehicle assessment analyzer of claim 3, the assessment list including heightened assessment readings that control the vehicle assessment analyzer to at least one of query or monitor at least one of the vehicle network computer and the vehicle communication bus according to vehicle specific callouts based on the VIN.

5. The vehicle assessment analyzer of claim 3, the assessment list including heightened assessment readings that control the vehicle assessment analyzer to query both of the vehicle network computer and the vehicle communication bus according to vehicle specific callouts based on the VIN.

6. The vehicle assessment analyzer of claim 1, the assessment list including heightened assessment readings that control the vehicle assessment analyzer to query one or both of the vehicle network computer and the vehicle communication bus according to vehicle specific callouts based on the VIN.

7. The vehicle assessment analyzer of claim 6, the vehicle specific callouts based further on community data.

8. The vehicle assessment analyzer of claim 6, the assessment list including a standard assessment list identifying assessment readings that control the vehicle assessment analyzer to query the vehicle network computer according to standard OBD callouts.

9. The vehicle assessment analyzer of claim 1, the assessment list including a standard assessment list identifying assessment readings that control the vehicle assessment analyzer to query the vehicle network computer according to common vehicle network computer callouts common to multiple manufacturers of vehicles.

10. The vehicle assessment analyzer of claim 1, the assessment list including at least one assessment condition; the vehicle assessment analyzer configured to verify the assessment condition is met prior to performing at least one of the one or more assessment readings.

11. The vehicle assessment analyzer of claim 1, the assessment data packet including raw data received directly from the vehicle communication bus.

12. The vehicle assessment analyzer of claim 1, the assessment data packet including transformed data based on a mathematical transform performed on raw data received from the vehicle.

13. The vehicle assessment analyzer of claim 1, the vehicle network computer being an on-board-diagnostics (OBD) network computer.

14. The vehicle assessment analyzer of claim 1, the vehicle communication bus being a controller area network (CAN) based communication bus.

15. The vehicle assessment analyzer of claim 1, the vehicle communication bus being one or more of a local interconnect network (LIN) communication bus and a media oriented systems transport (MOST) based communication bus.

16. The vehicle assessment analyzer of claim 1, the vehicle interface adapted to simultaneously couple with multiple vehicle communication busses.

17. The vehicle assessment analyzer of claim 1, the vehicle interface including a vehicle communication bus processor, the assessment readings including a filter to control the vehicle communication bus processor to monitor the vehicle communication bus for messages thereon matching the filter.

18. The vehicle assessment analyzer of claim 1, the memory further storing instructions for initializing the vehicle assessment analyzer by verifying a first communications link between the vehicle interface and the vehicle and a second communications link between the communications interface and the vehicle assessment analytics server.

19. The vehicle assessment analyzer of claim 1, the assessment list defining a number of times to assess one or more sensors of a vehicle.

20. The vehicle assessment analyzer of claim 1, the assessment list defining a time interval between each assessment reading of each respective sensor of a vehicle.

21. The vehicle assessment analyzer of claim 1, the assessment list further including one or more enhanced electronic control module (ECM) assessments, the ECM assessments defining ECM readings and ECM parameters to be performed by the vehicle assessment analyzer by monitoring one or more of the vehicle ECMs.

22. The vehicle assessment analyzer of claim 1, the assessment list being generated by the vehicle analytics server in response to receipt of the VIN.

* * * * *